United States Patent
Kawasaki

(10) Patent No.: US 12,533,765 B2
(45) Date of Patent: Jan. 27, 2026

(54) MULTI-AXIS PROCESSING MACHINE AND METHOD FOR MEASURING ROTATION CENTER OF MULTI-AXIS PROCESSING MACHINE

(71) Applicant: Sodick Co., Ltd., Kanagawa (JP)

(72) Inventor: Michihisa Kawasaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 824 days.

(21) Appl. No.: 17/888,485

(22) Filed: Aug. 16, 2022

(65) Prior Publication Data
US 2023/0067273 A1   Mar. 2, 2023

(30) Foreign Application Priority Data
Aug. 24, 2021   (JP) ................ 2021-136285

(51) Int. Cl.
  *G01B 21/22*   (2006.01)
  *B23Q 17/22*   (2006.01)

(52) U.S. Cl.
  CPC ......... *B23Q 17/2275* (2013.01); *G01B 21/22* (2013.01)

(58) Field of Classification Search
  CPC ............... B23Q 17/2275; G01B 21/22; G05B 2219/37043; G05B 19/401
  See application file for complete search history.

(56) References Cited

U.S. PATENT DOCUMENTS

| | | | |
|---|---|---|---|
| 6,546,640 B2 * | 4/2003 | Okada ............ | G01B 5/201 73/1.79 |
| 6,886,264 B2 * | 5/2005 | Sakata ............ | G01B 7/12 73/1.79 |
| 7,036,238 B2 * | 5/2006 | Kojima ............ | G01B 5/201 33/503 |
| 7,542,872 B2 * | 6/2009 | Kadowaki ........ | G01B 21/042 73/601 |
| 8,332,173 B2 * | 12/2012 | Ishikawa ......... | G01B 21/045 702/155 |
| 8,356,417 B2 * | 1/2013 | Hagino ........... | G01B 5/201 33/553 |

(Continued)

FOREIGN PATENT DOCUMENTS

| | | |
|---|---|---|
| JP | 2011038902 | 2/2011 |
| JP | 5686578 | 3/2015 |

(Continued)

*Primary Examiner* — Yaritza Guadalupe-McCall
(74) *Attorney, Agent, or Firm* — JCIPRNET

(57) ABSTRACT

A method for measuring a rotation center of a multi-axis processing machine 100 includes: using reference ball 8 and a measurement device 7 which has a probe 71 and measures, as a measurement value 72, a movement amount of the probe 71 when the reference ball 8 contacts the probe 71; executing a measurement process of rotating the rotation axis to measure the measurement value 72 in a state in which the reference ball 8 installed to one of the processing head 2 and the table 62, 63 contacts the probe 71 of the measurement device 71 installed to another of the processing head 2 and the table 62, 63; and executing a rotation center calculation process of calculating a rotation center of the rotation axis from the measurement value 72, a rotation angle of the rotation axis, and a position of a center of the reference ball 8.

7 Claims, 17 Drawing Sheets

(56) References Cited

U.S. PATENT DOCUMENTS

| | | | | |
|---|---|---|---|---|
| 8,401,692 B2* | 3/2013 | Knaupp | B24C 1/045 |
| | | | 451/99 |
| 8,494,800 B2* | 7/2013 | Matsushita | B23Q 1/5437 |
| | | | 702/95 |
| 8,680,806 B2* | 3/2014 | Mori | G05B 19/404 |
| | | | 318/632 |
| 8,786,243 B2* | 7/2014 | Mori | B23Q 17/22 |
| | | | 318/632 |
| 8,949,071 B2* | 2/2015 | Takanashi | G01B 7/282 |
| | | | 702/167 |
| 9,164,502 B2* | 10/2015 | Sakai | G05B 19/404 |
| 9,803,968 B2* | 10/2017 | Nakayama | G01B 5/201 |
| 11,420,303 B2* | 8/2022 | Yokota | B23Q 23/00 |
| 11,480,939 B2* | 10/2022 | Kawasaki | G05B 19/404 |
| 11,801,577 B2* | 10/2023 | Yokota | G05B 19/402 |
| 2001/0008047 A1 | 7/2001 | Okada | G01B 5/008 |
| | | | 33/503 |
| 2004/0200085 A1* | 10/2004 | Sakata | G01B 7/12 |
| | | | 33/550 |
| 2004/0244464 A1* | 12/2004 | Hajdukiewicz | G01B 21/042 |
| | | | 73/1.79 |
| 2010/0030368 A1* | 2/2010 | Hon | G01B 5/20 |
| | | | 700/195 |
| 2011/0173830 A1* | 7/2011 | Hagino | G01G 21/20 |
| | | | 33/553 |
| 2012/0065769 A1* | 3/2012 | Knaupp | B24C 9/00 |
| | | | 700/193 |
| 2021/0325846 A1* | 10/2021 | Kawasaki | G05B 19/404 |
| 2023/0067273 A1* | 3/2023 | Kawasaki | B23Q 17/2275 |

FOREIGN PATENT DOCUMENTS

| | | | | |
|---|---|---|---|---|
| JP | 2021169131 | | 10/2021 | |
| JP | 7128333 B1 * | | 8/2022 | G05B 19/401 |

* cited by examiner

MULTI-AXIS PROCESSING MACHINE AND METHOD FOR MEASURING ROTATION CENTER OF MULTI-AXIS PROCESSING MACHINE

CROSS-REFERENCE TO RELATED APPLICATION

This application claims the priority benefit of Japan application serial no. 2021-136285, filed on Aug. 24, 2021. The entirety of the above-mentioned patent application is hereby incorporated by reference herein and made a part of this specification.

BACKGROUND

Technical Field

The invention relates to a multi-axis processing machine and a method for measuring a rotation center of a multi-axis processing machine capable of correctly measuring a geometric error of a rotation axis.

Description of Related Art

A multi-axis working machine which performs processing of a complicated shape by bringing a tool close to an article under processing (referred to as workpiece in the following) from multiple angles is known conventionally. For example, a five-axis processing machine, such as a machining center formed by three straight axes and two rotation axes, includes a table rotating about A-axis and C-axis, and a tool sliding along X-axis, Y-axis, and Z-axis. The workpiece is mounted on the table, and by rotationally moving the workpiece about A-axis and C-axis while sliding the tool, processing of various shapes is performed.

In the five-axis processing machine so configured, owing to factors such as an error that occurs at the time of assembling, the bending due to the weight of the workpiece or a rotation shaft, or a displacement due to the heat of the rotation shaft, a geometric error (geometric deviation) occurs in the location of the rotation center of the rotation axis. Moreover, the geometric deviations of the axes increase as the number of axes increases, and the accuracy of processing the workpiece is significantly affected.

Accordingly, in order to resolve the issue of the accuracy of processing the workpiece, an adjustment process for obtaining the position of the rotation center is manually performed by the operator before the processing is performed.

Specifically, as shown in FIG. 14, a reference ball 8 is installed to an installation part 21 of a processing head 2, and a dial gauge 510 is disposed on a turn table 62. Then, a tilt table 63 is rotated about A-axis and stopped at a predetermined angle, and every time the reference ball 8 is brought into contact with a probe 511 of the dial gauge 510, the operator visually observes the scale of the dial gauge and records a measurement value. The same process is also performed for C-axis. Lastly, the operator inputs the recorded measurement value into centering software and sets the position of the rotation center obtained in the centering software in the five-axis processing machine, thus completing the adjustment process.

In addition, the adjustment process for obtaining the position of the rotation center is not limited to the method using the dial gauge 510, a method of bringing a touch probe into contact with the reference ball (Patent Document 1) or a method of using a ball bar (Patent Document 2) is also present.

PRIOR ART DOCUMENT

Patent Document

[Patent Document 1] Japanese Patent No. 5686578
[Patent Document 2] Japanese Patent Laid-open No. 2011-38902
[Patent Document 3] Japanese Patent Application No. 2020-072646

Since a difference in the position of the rotation center occurs due to thermal deformation of a rotation shaft, it is desirable that the adjustment process be performed right before finishing, which is when the thermal deformation of the rotation shaft is saturated, for example. Moreover, since the position of the rotation center differs as the position where the processing is actually performed differs and differs as the mass on the table when the processing is performed differs, it is desirable that the adjustment process be performed under the same condition as the processing condition when the processing is actually performed. However, with the operator manually performing the adjustment process to meet the processing condition for every processing, the processing time is increased, and the efficiency is low.

In view of the above, the inventor of the application invented and filed an application for a method which refers to a processing program in the case of performing the adjustment process for the position of the rotation center and measures the position of the rotation center by using a rotation angle used in actual processing (Patent Document 3).

SUMMARY

An aspect of the invention discloses a method for measuring a rotation center of a multi-axis processing machine. The multi-axis processing machine has a rotation axis, and a processing head and a table are configured to be relatively rotatable. The method uses a reference ball and a measurement device which has a probe and measures, as a measurement value, a movement amount of the probe when the reference ball contacts the probe. In addition, the method includes: executing a measurement process of rotating the rotation axis to measure the measurement value in a state in which the probe of the measurement device installed to one of the processing head and the table contacts the reference ball installed to another of the processing head and the table; and executing a rotation center calculation process of calculating a rotation center of the rotation axis from the measurement value, a rotation angle of the rotation axis, and a position of a center of the reference ball.

In addition, another aspect of the invention provides a multi-axis processing machine including: a rotation axis and a controller, wherein a processing head and a table are configured to be relatively rotatable by the rotation axis. The controller uses a reference ball and a measurement device which has a probe and measures, as a measurement value, a movement amount of the probe when the reference ball contacts the probe, and is configured to execute: a measurement process of rotating the rotation axis to measure the measurement value in a state in which the probe of the measurement device installed to one of the processing head and the table contacts the reference ball installed to another of the processing head and the table; and a rotation center calculation process of calculating a rotation center of the rotation axis from the measurement value, a rotation angle of the rotation axis, and a position of a center of the reference ball.

DESCRIPTION OF THE EMBODIMENTS

Figure 1:
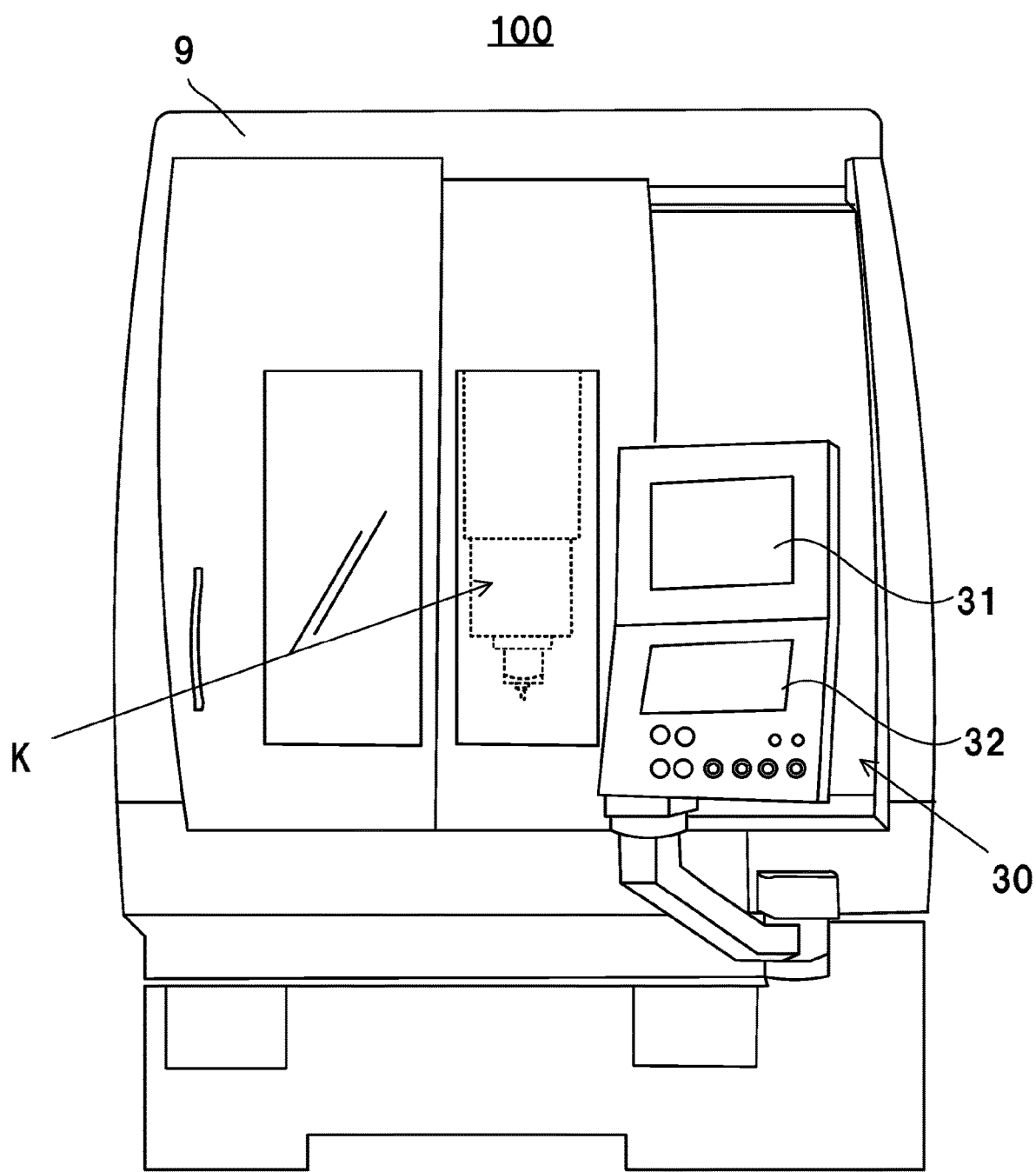
FIG. 1 is a schematic view illustrating a five-axis processing machine 100 according to a first embodiment of the invention.

The invention provides a multi-axis processing machine and a method for measuring the rotation center of the multi-axis processing machine capable of more simply, quickly, and accurately calculating the rotation center of the rotation axis, and having high workpiece processing accuracy.

An aspect of the invention discloses a method for measuring a rotation center of a multi-axis processing machine. The multi-axis processing machine has a rotation axis, and a processing head and a table are configured to be relatively rotatable. The method uses a reference ball and a measurement device which has a probe and measures, as a measurement value, a movement amount of the probe when the reference ball contacts the probe. In addition, the method includes: executing a measurement process of rotating the rotation axis to measure the measurement value in a state in which the probe of the measurement device installed to one of the processing head and the table contacts the reference ball installed to another of the processing head and the table; and executing a rotation center calculation process of calculating a rotation center of the rotation axis from the measurement value, a rotation angle of the rotation axis, and a position of a center of the reference ball.

In addition, another aspect of the invention provides a multi-axis processing machine including: a rotation axis and a controller, wherein a processing head and a table are configured to be relatively rotatable by the rotation axis. The controller uses a reference ball and a measurement device which has a probe and measures, as a measurement value, a movement amount of the probe when the reference ball contacts the probe, and is configured to execute: a measurement process of rotating the rotation axis to measure the measurement value in a state in which the probe of the measurement device installed to one of the processing head and the table contacts the reference ball installed to another of the processing head and the table; and a rotation center calculation process of calculating a rotation center of the rotation axis from the measurement value, a rotation angle of the rotation axis, and a position of a center of the reference ball."

Here, "table" is a general term referring to a tilt table and a turn table in the embodiments.

According to the invention, with the operator installing the reference ball and the measurement device to the multi-axis processing machine, the multi-axis processing machine is automatically driven to obtain a detection value and calculate the rotation center. Therefore, an adjustment process for obtaining the position of the rotation center can be simply performed within a short time.

In addition, the method for measuring the rotation center according to the invention includes a measurement point search process of, before the measurement process, monitoring the measurement value while changing relative positions between the reference ball and the probe in the state in which the probe contacts the reference ball, and setting a maximum value of the measurement value as the measurement value for calculating the rotation center.

According to the invention, it is possible to change the relative positions between the reference ball and the measurement device to obtain the optimal measurement point, so that the center of the reference ball is located on the extending line of the central line of the probe in the measurement point search process. Therefore, the rotation center can be obtained by using a stable measurement value.

According to the method for measuring the rotation center of the invention, in the measurement process, it is possible to select a method for obtaining the measurement value from multiple types in the measurement process, and it is possible to select whether the measurement value is obtained by using the measurement device in a state in which the processing head, the rotation axis, and the table are temporarily stopped and the measurement value is obtained by using the measurement device while the processing head, the rotation axis, and the table are moved continuously without being stopped temporarily.

According to the invention, it is possible to obtain the rotation center in a state close to actual processing. Therefore, the position of the rotation center can be obtained accurately.

The method for measuring the rotation center of the invention includes a processing program analysis process of analyzing a processing program and calculating a measurement position for measuring the rotation center or a method for obtaining the measurement value based on an analysis result.

According to the invention, the processing program used at the time of actually processing the workpiece is analyzed, and the measurement position for performing the rotation center measurement is derived from the command angle of the tool posture in the processing program. Accordingly, it is possible to calculate the accurate position of the rotation center.

The invention provides a multi-axis processing machine and a method for measuring a rotation center of the multi-axis processing machine capable of accurately calculating the rotation center of a rotation axis, and having high workpiece processing accuracy.

As an embodiment of a multi-axis processing machine and a method for measuring a rotation center of the multi-axis processing machine, a five-axis processing machine 100 is described with reference to the drawings.

The multi-axis processing machine of the invention is not limited to a five-axis processing machine, and may also include a device in which a rotation shaft is mounted in a fine hole processing machine, a shaping processing machine, a wire electric discharge machine.

1. First Embodiment (1.1. Overall Configuration of Five-Axis Processing Machine 100)

Figure 2:
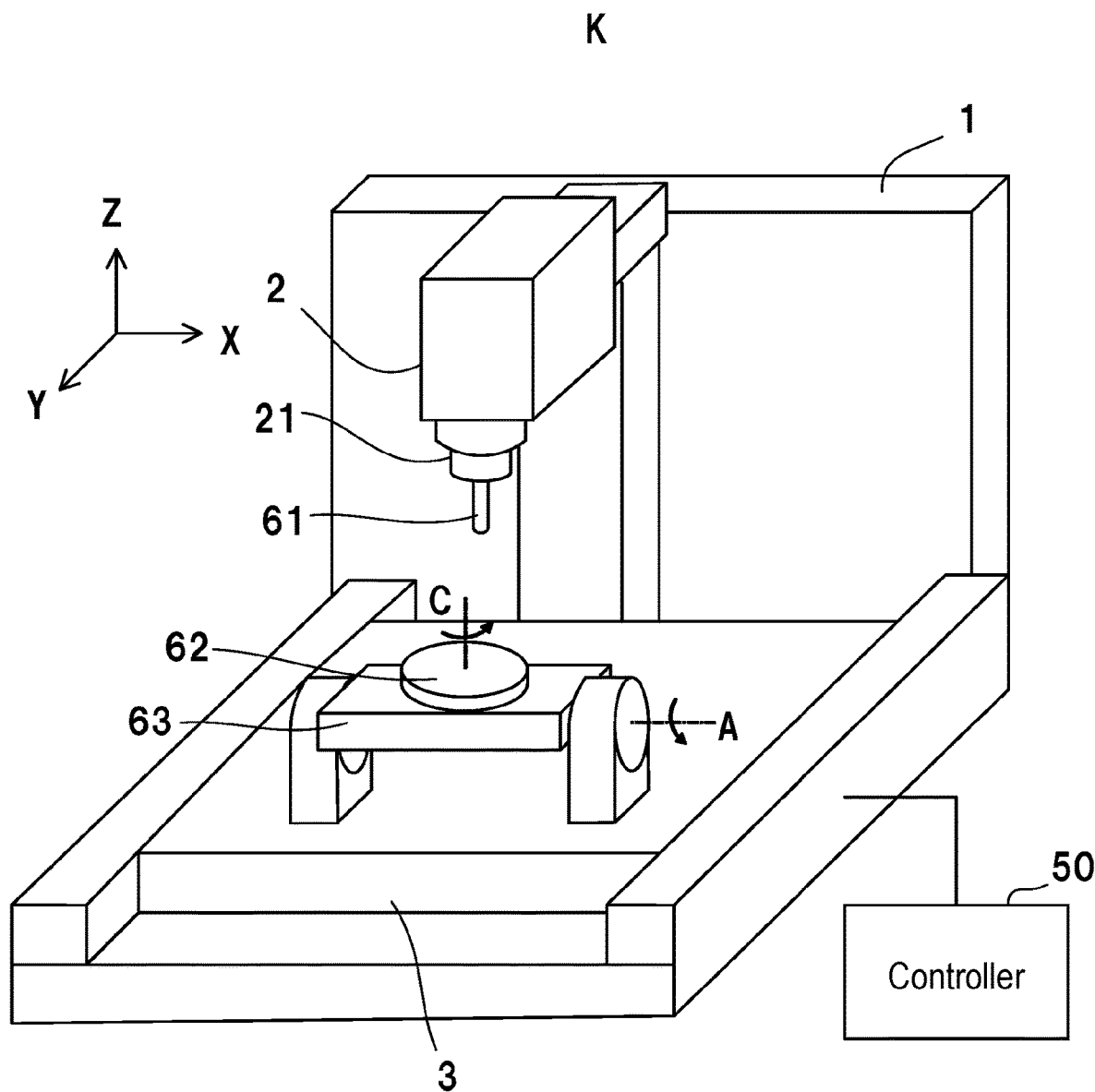
FIG. 2 is a schematic view illustrating an internal configuration of the five-axis processing machine 100 according to the embodiment.
Figure 3:
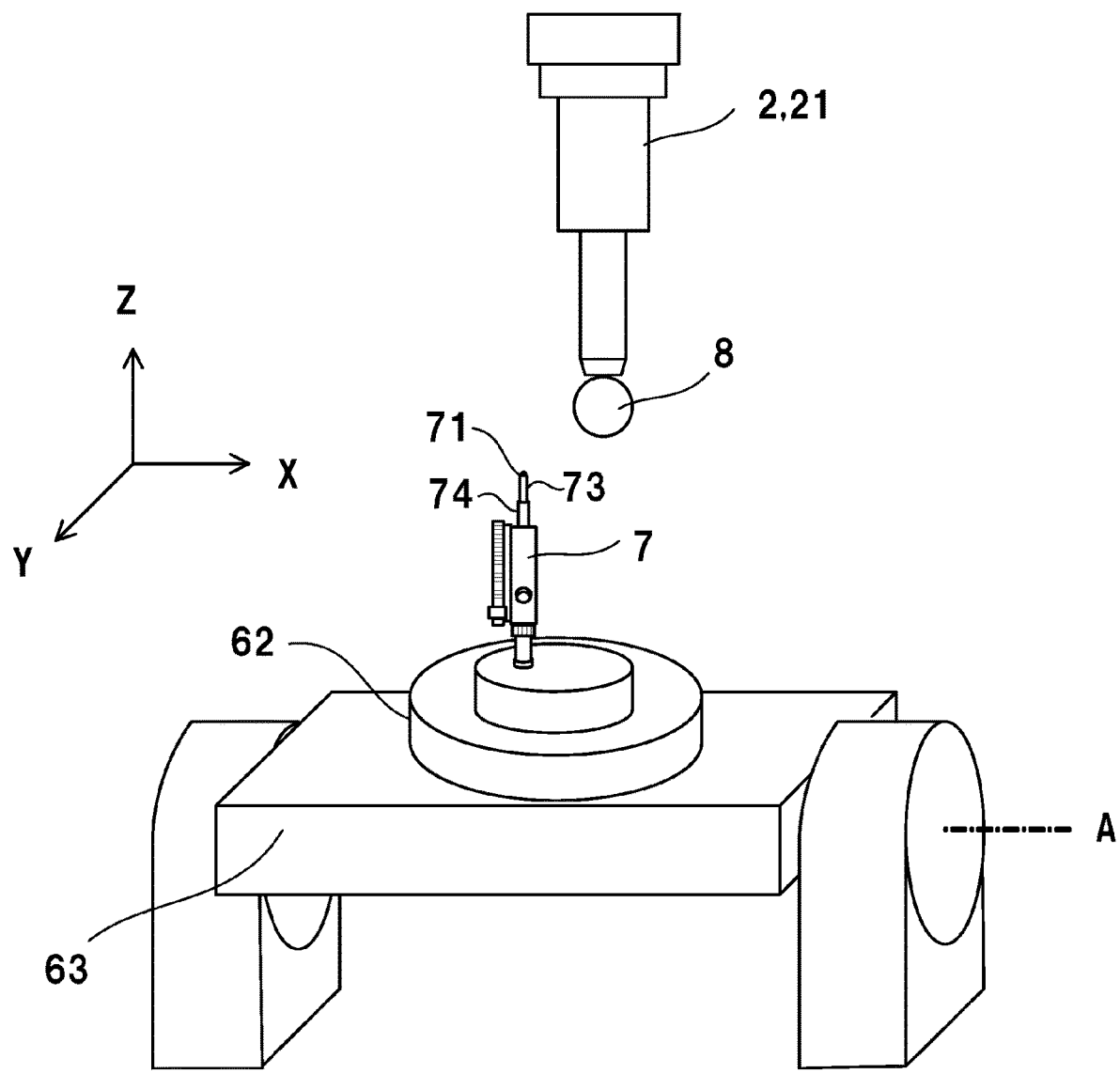
FIG. 3 is a schematic view illustrating a state in which a measurement device 7 and a reference ball 8 are installed to the five-axis processing machine 100 according to the embodiment.

With reference to FIGS. 1, 2, and 3, a configuration of the five-axis processing machine 100 is described. FIG. 1 is a schematic diagram illustrating the five-axis processing machine 100 according to the first embodiment of the invention, and FIG. 2 is a schematic diagram illustrating an internal configuration of the five-axis processing machine 100.

The five-axis processing machine 100 is a processing machine which performs five-axis control for three straight axes (i.e., X-axis, Y-axis, and Z-axis) and two rotation axes, and is a table-turning type in which a workpiece is turned together with a tilt table 63. In the five-axis processing machine 100, X-axis, Y-axis and Z-axis orthogonal to each other are set, a rotation axis about an axis extending in parallel with X-axis is set as A-axis, and a rotation axis about an axis extending in parallel with Z-axis is set as C-axis.

The five-axis processing machine 100 includes a base 1, a processing head 2, a Y-axis movement table 3, the tilt table 63 mounted on the Y-axis movement table 3 and configured to be rotatable about A-axis, a turn table 62 mounted on the tilt table 63 and configured to be rotatable about C-axis, and a controller 50.

A processing area K including the base 1, the processing head 2, the Y-axis movement table 3, the tilt table 63, and the turn table 62 is provided inside a housing 9 of the five-axis processing machine 100.

The processing head 2 is configured to be movable with respect to the base 1 in the X-axis direction and the Z-axis direction. The installation part 21 for installation of a tool 61 is provided at the processing head 2. By rotating the installation part 21, the tool 61 is rotated to be able to perform a cutting process.

The Y-axis movement table 3 is configured to be movable with respect to the base 1 in the Y-axis direction. The tilt table 63 is mounted on the Y-axis movement table 3. The turn table 62 is further mounted on the tilt table 63. By mounting a workpiece on the turn table 62, the operator can process the workpiece by using the tool 61.

The tilt table 63 is configured to be rotatable about A-axis as the rotation axis, and is mounted on the Y-axis movement table 3 to be parallel to A-axis and X-axis.

The turn table 62 is configured to be rotatable about C-axis as the rotation axis. In the case where the rotation angle of A-axis is 0°, the turn table 62 is mounted on the tilt table 63 to be parallel to C-axis and Z-axis. By rotating the tilt table 63 and the turn table 62 about A-axis and C-axis at arbitrary angles, the posture of the workpiece mounted on the turn table 62 with respect to the tool 61 can be changed to be processed.

FIG. 3 is a schematic view illustrating a state in which a measurement device 7 and a reference ball 8 are installed to the five-axis processing machine 100.

Although it is desired that the position of the rotation axis of A-axis of the tilt table 63 and the position of the rotation axis of C-axis of the turn table 62 remain constant, errors in the positions of the rotation centers may occur in actual situation due to factors such as an installation error of each table, bending resulting from the weight of the workpiece or a rotation shaft, a displacement due to heat of the rotation shaft, etc.

Therefore, in the embodiment, an adjustment process using the reference ball 8 and the measurement device 7 is performed, the actual positions of the rotation centers of A-axis and C-axis are measured to be used in a subsequent processing process. Here, "positions of the rotation centers" of A-axis and C-axis are center coordinates of the rotation axes of A-axis and C-axis. Details of the method for the adjustment process will be described in the following.

The reference ball 8 is a reference ball used for measuring the accuracy of the five-axis processing machine, and a conventional one can be used. The reference ball 8 is installed to the installation part 21 of the processing head 2 of the five-axis processing machine 100 to be used.

The measurement device 7 has a probe 71 provided at the tip of the measurement device 7, and is a sensor measuring a movement amount of the probe 71 as a measurement value 72 when the probe 71 contacts the reference ball 8. A dial gauge can be used as the measurement device 7. The measurement device 7, for example, includes a hollow stem 74, a spindle 73 movable through the stem 74 inside the stem 74, and the probe 71 provided at the tip of the spindle 73. In addition, the measurement device 7 measures the movement amount of the spindle 73 as the measurement value 72 in the case where the probe 71 contacts the reference ball 8. The measurement device 7 has a function of transmitting the measurement value 72 to the controller 50 in a wired or wireless manner. Meanwhile, the controller 50 stores the measurement value 72 received from the measurement device 7 in a storage 40 via an inputter 20.

The measurement device 7 is used by being installed onto the turn table 62 via a jig, etc. In the case of adjusting the position of the rotation center of A-axis, the measurement device 7 is installed so that the orientation of the probe 71 is consistent with the Z-axis direction, and in the case of adjusting the position of the rotation center of C-axis, the measurement device 7 is installed so that the orientation of the probe 71 is consistent with the Y-axis direction.

The measurement device 7 may be disposed at an actual position where the workpiece to be processed is disposed. By performing measurement at a position close to the actual processing, it is possible to more accurately calculate the position of the rotation center of the rotation axis.

(1.2. Functional Configuration of Five-Axis Processing Machine 100)

Figure 4:
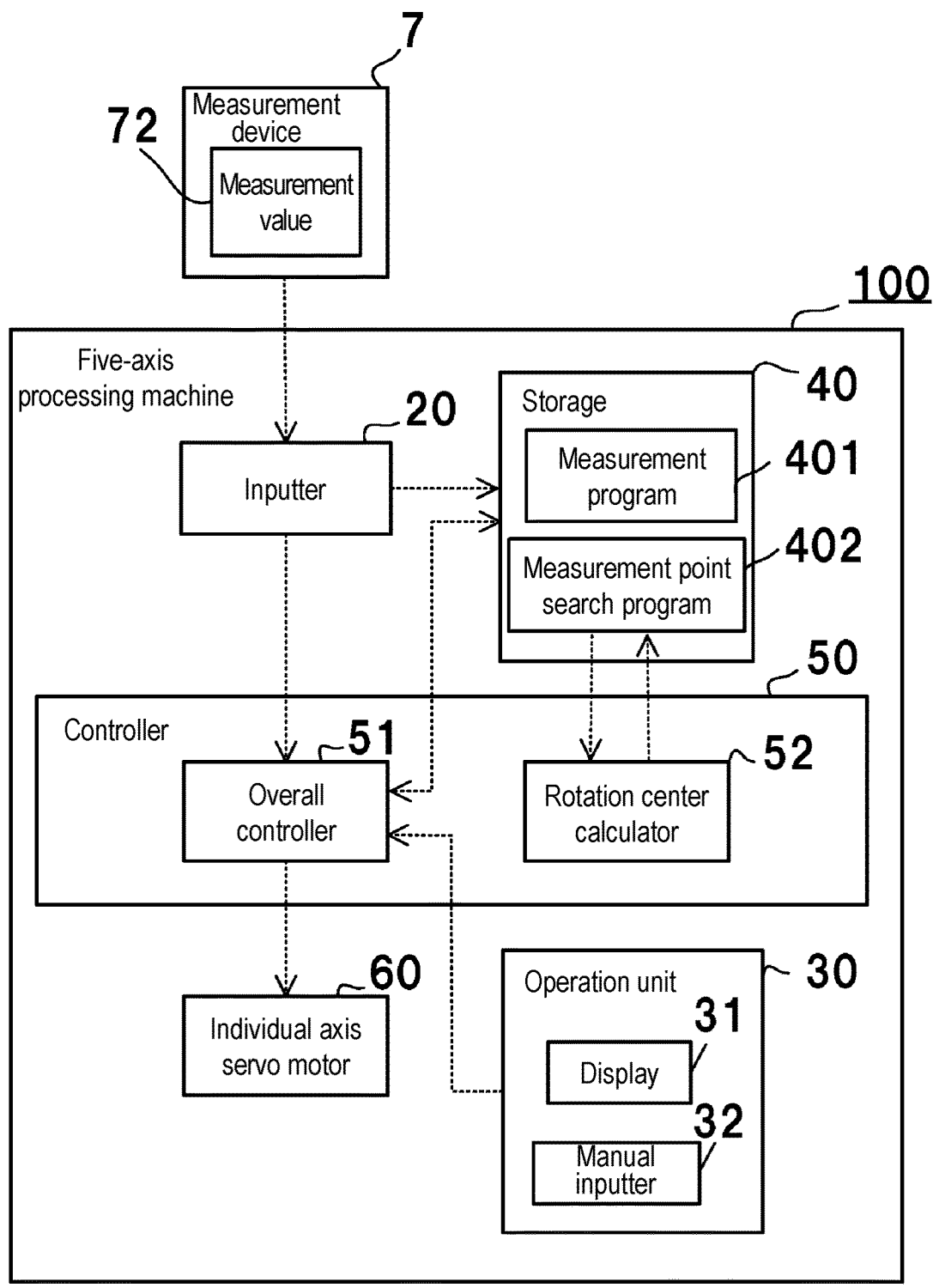
FIG. 4 is a block diagram illustrating the five-axis processing machine 100 according to the embodiment.

FIG. 4 is a block diagram illustrating the five-axis processing machine 100. As shown in FIG. 4, the five-axis processing machine 100 includes the inputter 20, an operation unit 30, the storage 40, the controller 50, and a servo motor 60.

The five-axis processing machine 100 drives the Y-axis movement table 3, the tilt table 63, the turn table 62, and each servo motor 60 provided at the processing head based on the measurement program 401 for measuring the rotation center of the rotation axis, obtains the measurement value obtained from the measurement device 7, and calculates the positions of the rotation centers of A-axis and C-axis.

The inputter 20 is an interface for managing data transmission, such as a wired or wireless line, between the measurement device 7 and the five-axis processing machine 100, and has a function of obtaining the measurement value 72 measured by the measurement device 7, performing various signal processes, and transmitting a signal to the controller 50.

The operation unit 30 includes a display 31 and a manual inputter 32. A keyboard or a touch panel, etc., is used as the manual inputter 32. The operator can perform various settings of the five-axis processing machine 100 by using the manual inputter 32 in accordance with contents displayed on the display 31.

Specifically, the display 31 displays a setting screen for performing the rotation center measurement of the rotation axis. By using the manual inputter 32, the operator can perform various settings, such as selecting the rotation axis with respect to the five-axis processing machine 100, selecting the start instruction of the measurement of the rotation center, and selecting the method for obtaining the measurement value 72, etc.

The storage 40 is formed by a random access memory (RAM), a dynamic random access memory (DRAM), etc., and is used as a working area when the controller 50 executes processes based on various programs. In addition, the storage 40 includes a non-volatile memory such as a read-only memory (ROM) or a solid-state drive (SSD), and stores the measurement program 401, a measurement point search program 402, and data such as setting values, etc., used in the processes of the controller 50. In addition, the storage 40 stores various measurement data such as the measurement value 72 output at the time of measuring the rotation center.

Figure 5:
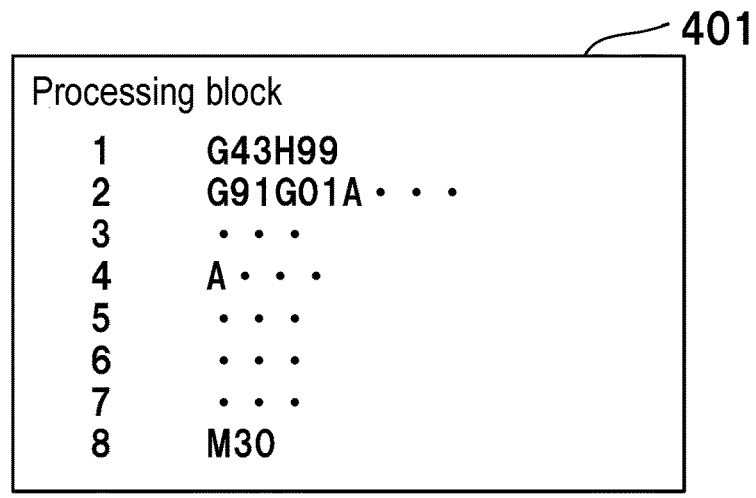
FIG. 5 is a schematic diagram outlining a measurement program 401 of the five-axis processing machine 100 according to the embodiment.

FIG. 5 is a schematic diagram illustrating the contents of a measurement program 401 of the five-axis processing machine 100.

The measurement program 401 is a program for executing the measurement process, and includes codes for driving the rotation axis. Specifically, the measurement program 401 is formed by multiple processing blocks (FIG. 5). The processing blocks record a center command position and posture command angles of the reference ball 8, G codes of instruction for tool tip point control, and F codes instructing relative velocities of the reference ball 8 with respect to the measurement device 7, etc. Here, "center command position of the reference ball 8" refers to a position command value of the reference ball 8 defined in the measurement program 401, and, more specifically, a command value of the position of a center CS of the reference ball 8 with respect to the measurement device 7. In addition, "posture" refers to relative postures between the measurement device 7 and the reference ball 8. The posture command angle is designated as a rotation angle of the rotation axis (A-axis, C-axis) in each processing block.

An overall controller 51 drives the Y-axis movement table 3, the tilt table 63, the turn table 62, and each servo motor 60 provided at the processing head 2 based on the measurement program 401 in the case of measuring the rotation center of the rotation axis.

Regarding the measurement program 401, multiple programs are stored in the storage 40 for each of A-axis and C-axis. Specifically, the operator can select the method for obtaining the measurement value 72 from multiple types of methods, and the programs for executing these methods are stored. Examples of the multiple types of methods for obtaining the measurement value 72 include, for example, a stop mode of obtaining the measurement value 72 by using the measurement device 7 in a state in which the Y-axis movement table 3, the tilt table 63, the turn table 62, and the processing head 2 are stopped and a continuous mode of obtaining the measurement value 72 with the Y-axis movement table 3, the tilt table 63, the turn table 62, and the processing head 2 being continued in a state of being driven by the respective servo motors 60. In the case where processing is performed while the rotation axis is rotated in actual processing, the rotation center may be measured in the continuous mode, and in the case where processing is performed while the rotation axis is stopped in actual processing, the rotation center may be measured in the stop mode. It is possible to obtain the rotation center in a state similar to the actual processing.

The measurement point search program 402 is a program for executing a measurement point search process, and includes G codes and F codes for driving the processing head 2 or the Y-axis movement table 3.

The servo motor 60 is provided in each of the Y-axis movement table 3, the tilt table 63, the turn table 62, and the processing head 2. By driving each servo motor 60 according to the command of the overall controller 51, each component can be rotated or moved.

(1.3. Functional Configuration of Controller 50)

The controller 50 is formed by the overall controller 51 and a rotation center calculator 52.

The overall controller 51 is formed by a central processing unit (CPU), a microprocessor, a digital signal processor (DSP), etc., controls the overall operation of the five-axis processing machine 100, and drives each servo motor 60.

In addition, the overall controller 51 executes the measurement program 401 and the measurement point search program 402.

The rotation center calculator 52 calculates the positions of the rotation centers of A-axis and C-axis by using the least square method based on the measurement values 72 measured by the measurement device 7, the position of the center CS of the reference ball 8, and the angles of the rotation axes, and stores the positions of the obtained rotation centers in the storage 40.

The overall controller 51 uses the position of the rotation center obtained by using the rotation center calculator 52 as the position of the rotation center of the rotation axis in a subsequent processing process.

(1.4. Description of Method for Measuring Rotation Center)

Figure 7:
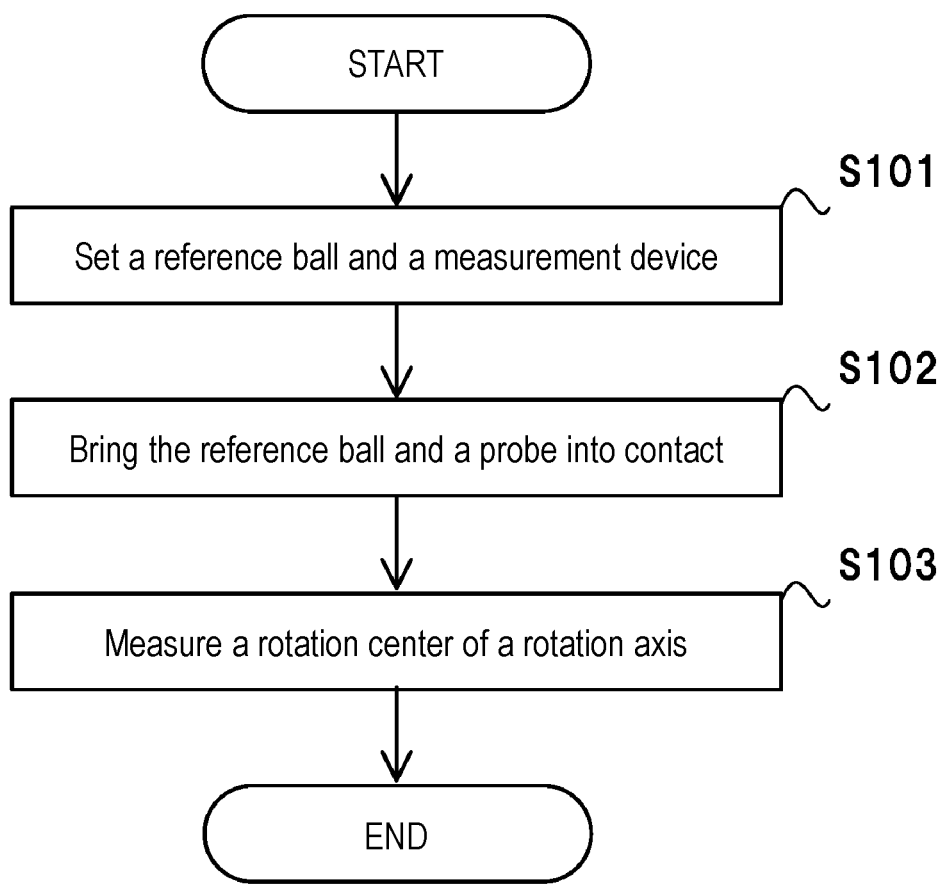
FIG. 7 is a diagram of an overall flow illustrating a procedure for measuring a rotation center of the five-axis processing machine 100 according to the embodiment.

FIG. 7 is a diagram of an overall flow illustrating a procedure of the method for measuring the rotation center of the five-axis processing machine 100.

In the case of measuring the rotation center of the rotation axis before a finishing process, etc., the operator performs the process according to the following procedure.

The operator installs the reference ball 8 to the installation part 21 of the processing head 2, and disposes the measurement device 7 on the turn table 62 (S101, FIGS. 3 and 7). The measurement device 7 may disposed at an actual processing position where the workpiece is disposed in the case where processing is actually performed.

Then, the operator operates the processing head 2 and the Y-axis movement table 3 via the manual inputter 32 to move the reference ball 8 to a position contacting the probe 71 of the measurement device 7 (S102).

Then, the operator operates the manual inputter 32 and performs the setting of rotation center measurement displayed on the setting screen. Examples as the setting of rotation center measurement include selecting the rotation axis or selecting the method for obtaining the measurement value 72. Then, when the operator presses a start button, etc., for carrying out the measurement, the rotation center measurement is started (S103: rotation center measurement process).

Here in S102, the operator moves the reference ball 8 to the position contacting the probe 71 via the manual inputter 32. However, the reference ball 8 may also be moved by the overall controller 51 instead. Specifically, the operator operates the processing head 2 and the Y-axis movement table 3 via the manual inputter 32 to move the reference ball 8 to the vicinity of the probe 71, and presses a start button for carrying out the measurement. The overall controller 51 moves the reference ball 8 by moving the processing head 2 and the Y-axis movement table 3, makes the probe 71 contact the reference ball 8 in a state of being pressed by a predetermined amount, and stops the reference ball 8. Then, the rotation center measurement is started (S103: rotation center measurement process).

Figure 8:
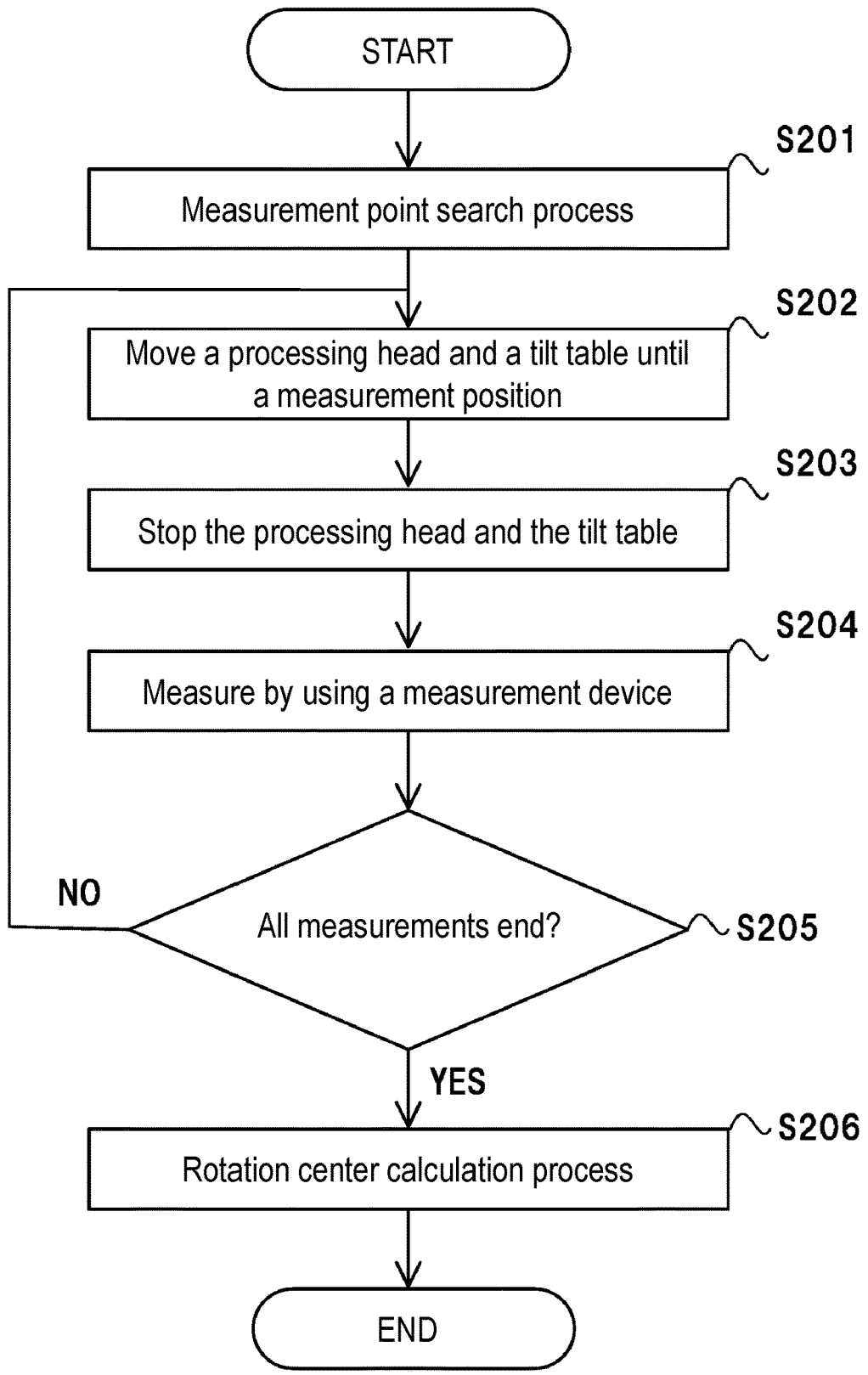
FIG. 8 is a flowchart illustrating a rotation center measurement process (stop mode) of the five-axis processing machine 100 according to the embodiment.
Figure 10:
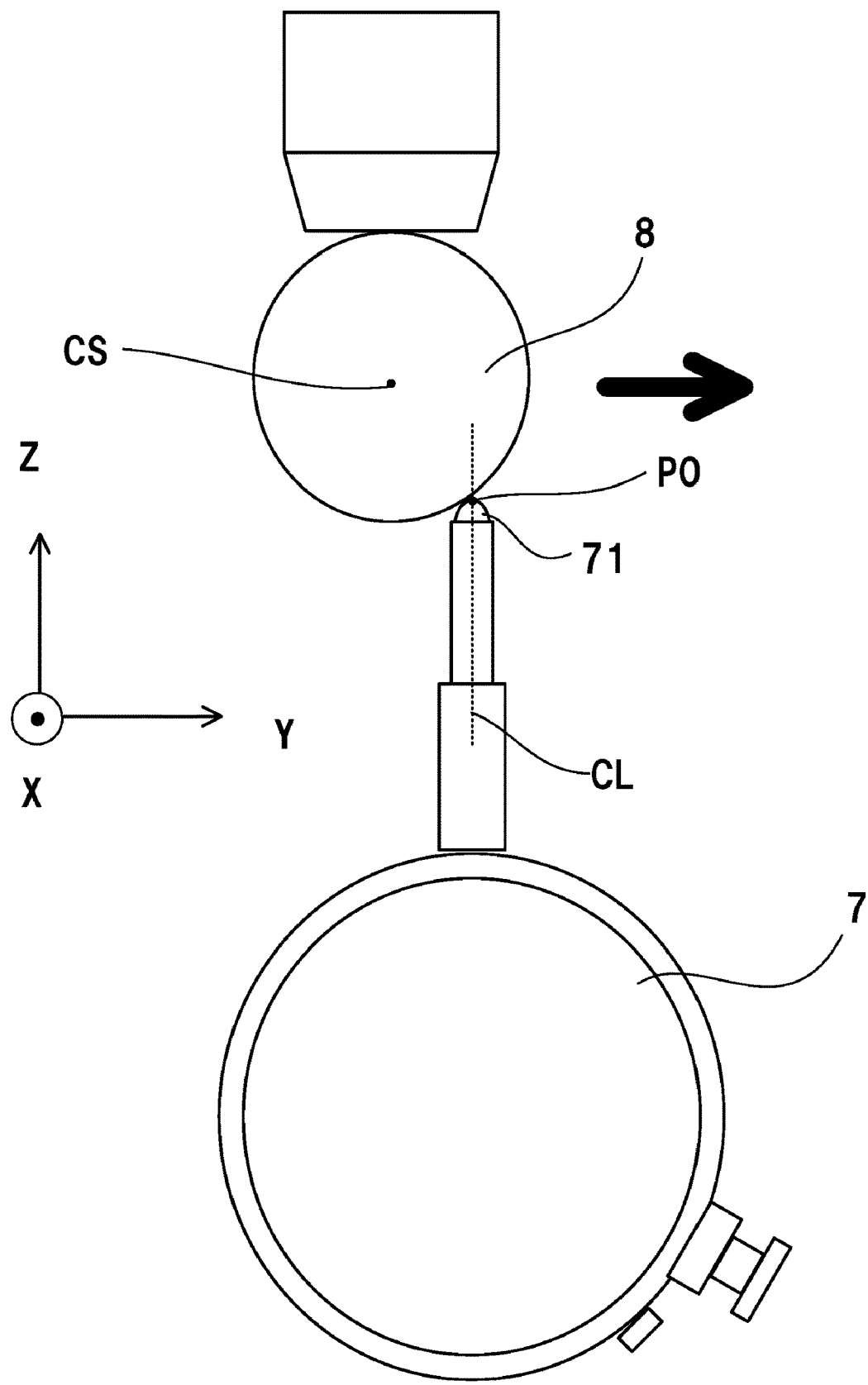
FIG. 10 is a first view illustrating a measurement point search process of the five-axis processing machine 100 according to the embodiment.
Figure 11:
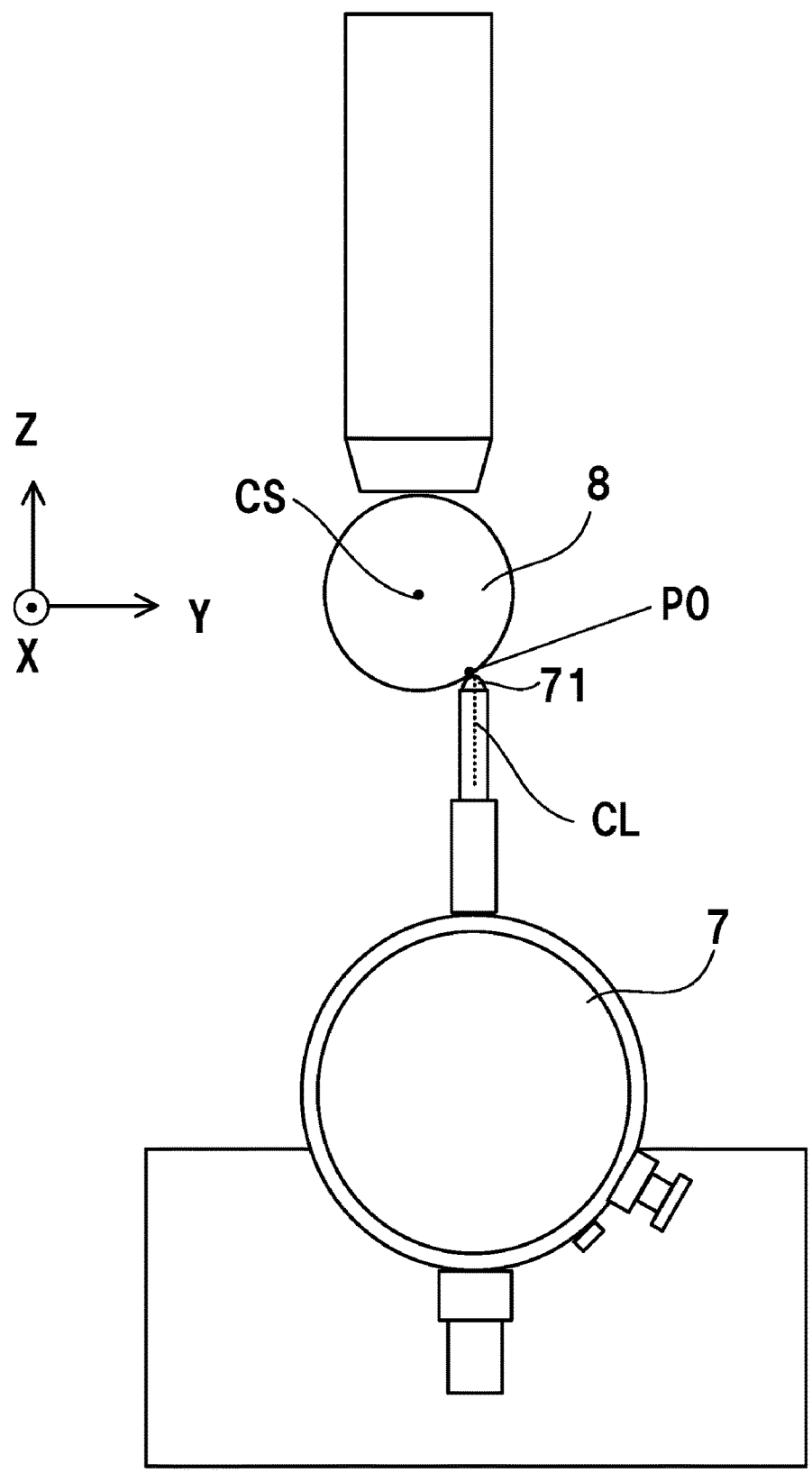
FIG. 11 is a second view illustrating the measurement point search process of the five-axis processing machine 100 according to the embodiment.
Figure 12:
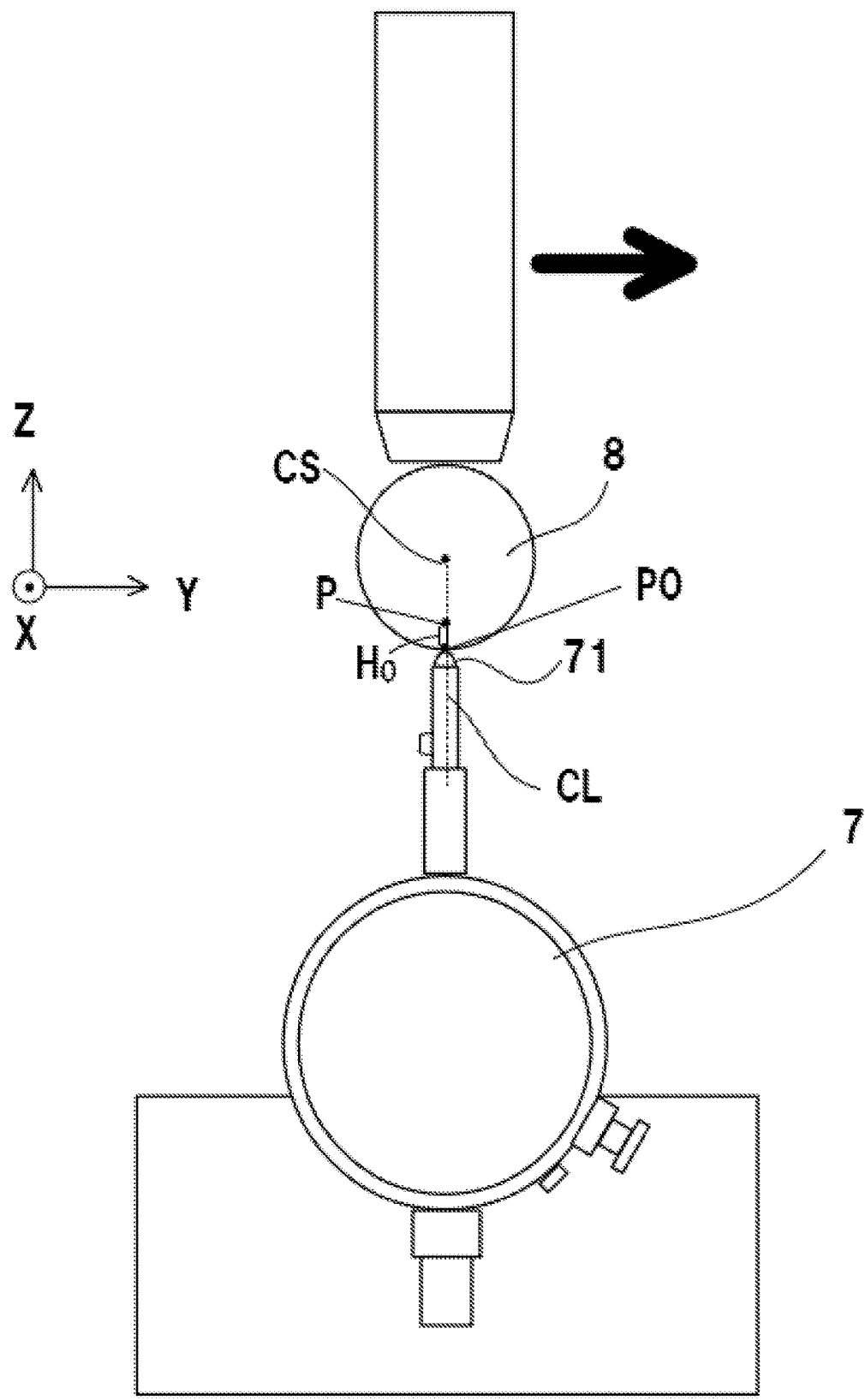
FIG. 12 is a third view illustrating the measurement point search process of the five-axis processing machine 100 according to the embodiment.

FIG. 8 is a flowchart illustrating the rotation center measurement process (stop mode) of the five-axis processing machine 100. FIGS. 10, 11, and 12 are views illustrating the measurement point search process of the five-axis processing machine 100. In the following, the case of measuring the position of the rotation center of A-axis is described as an example. However, the same applies to the case of measuring the position of the rotation center of C-axis. When the rotation center measurement process starts, the overall controller 51 executes the measurement point search process searching for a measurement point P0 at the time of measuring the rotation axis (S201: measurement point search process). Here, the measurement point refers to the contact point at which the reference ball 8 and the probe 71 of the measurement device 7 contact. The measurement value 72, which is the movement amount of the probe 71 at the measurement point, is obtained. If the measurement value 72 is not obtained by making the probe 71 contact the reference ball 8 in a state in which a central line CL of the probe 71 (FIGS. 10 to 12) is orientated toward the center CS of the reference ball 8, the probe 71 may move on the reference ball 8 and the measurement value 72 becomes unstable (FIG. 10). Therefore, in the measurement point search process, the relative positions between the reference ball 8 and the measurement device 7 are changed to obtain the optimal measurement point P0, so that the center CS of the reference ball 8 is located on an extending line of the central line CL of the probe 71.

Specifically, the overall controller 51 obtains the measurement point search program 402, and moves the processing head 2 in the X-axis direction and moves the Y-axis movement table 3 in the Y-axis direction in the state in which the reference ball 8 contacts the probe 71 in accordance with the measurement point search program 402 (FIGS. 10 and 11). The overall controller 51 changes the relative positions between the reference ball and the measurement device 7 in the X-axis direction and the Y-axis direction while monitoring the measurement value 72 of the measurement device 7. The measurement point P0 where the measurement value 72 of the measurement device 7 is maximum is set as the optimal measurement position (FIG. 12), and the measurement value at such measurement position, the rotation angle of A-axis, and the position of the center CS of the reference ball 8 are stored in the storage 40. Here, P refers to the position of the tip of the probe 71 in the case where the probe 71 does not contact the reference ball 8, and H0 refers to a measurement value at the measurement point P0. In general, in the case where the measurement point search process is executed, since the tilt table 63 is in a horizontal state, the rotation angle of A-axis is 0 degrees. Also, since the current position of the center CS of the reference ball 8 is kept as the current coordinate values of the reference ball 8 by the overall controller 51, such information is stored in the storage 40.

Figure 13:
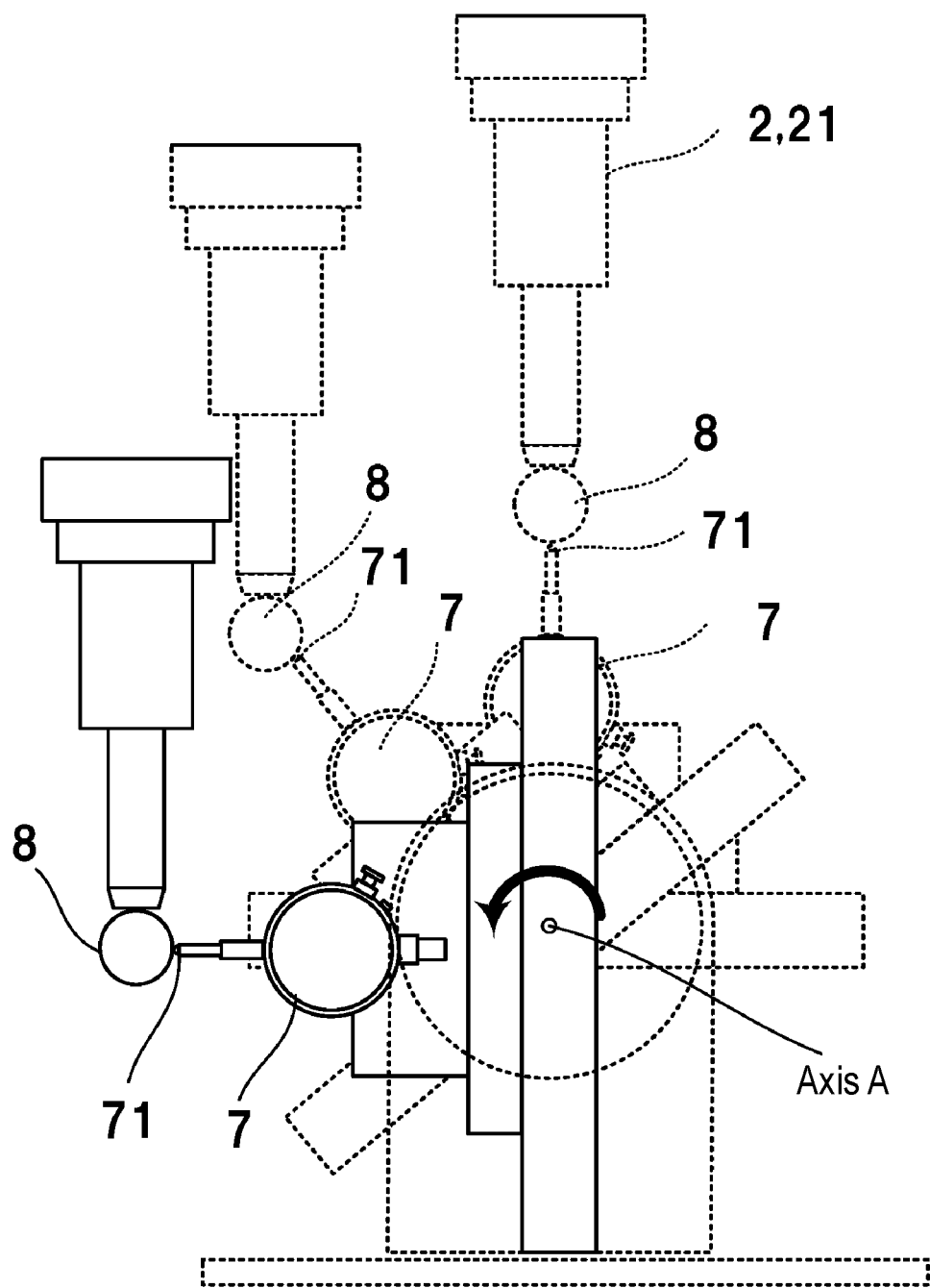
FIG. 13 is a schematic view illustrating a state in which a tilt table 63 is rotated about A-axis in the rotation center measurement process according to the embodiment.
Figure 14:
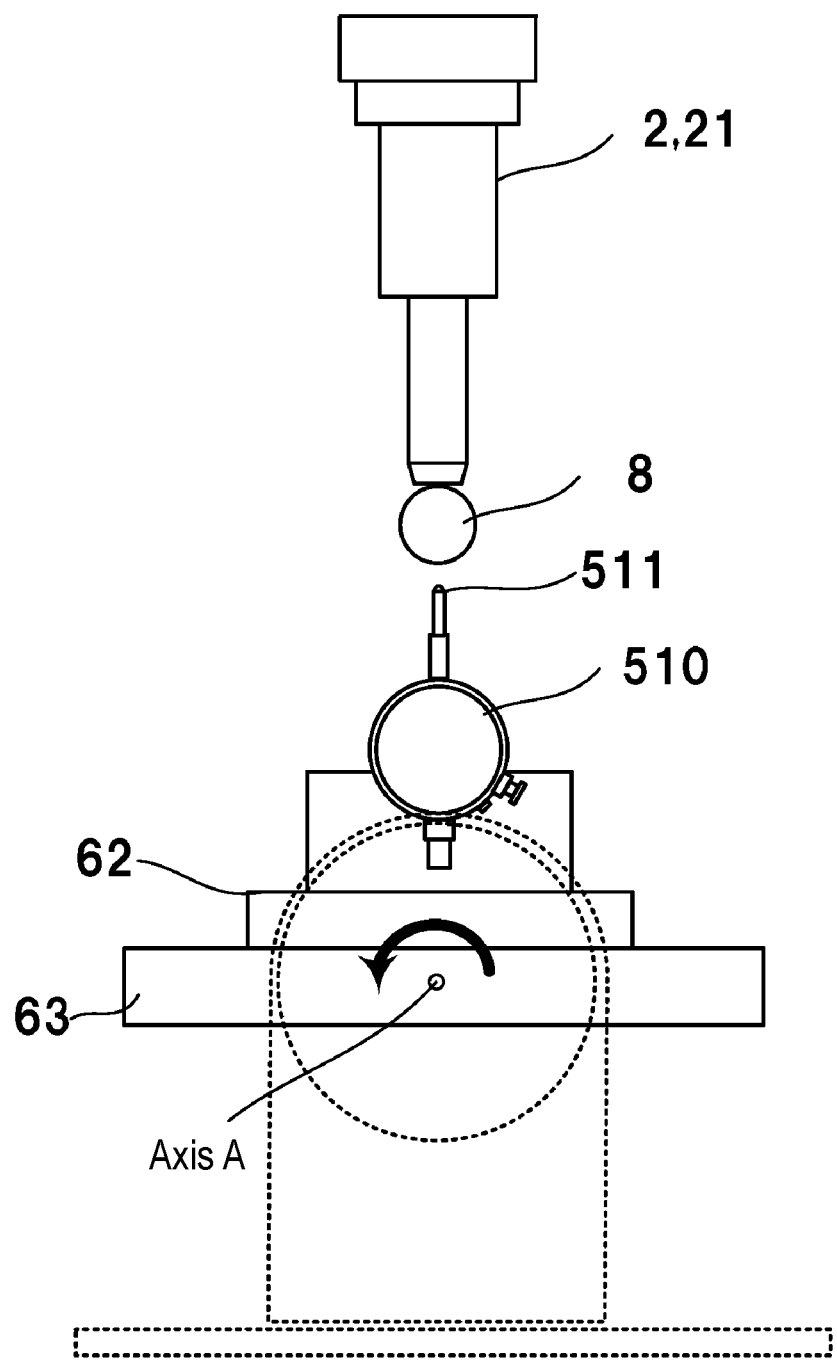
FIG. 14 is a view illustrating a conventional process for calculating a position of the rotation center.

FIG. 13 is a schematic view illustrating a state in which the tilt table 63 is rotated about A-axis in the rotation center measurement process.

After the measurement point search process ends, the overall controller 51 executes the measurement process (S202 to S205). Specifically, in the case where the stop mode is selected through the setting screen, the overall controller 51 obtains the measurement program 401 for the stop mode from the storage 40, and, in the state in which the reference ball 8 contacts the probe 71 of the measurement device 7, rotates the tilt table 63 about A-axis, performs tip point control and moves the processing head 2 and the Y-axis movement table 3 by following the rotation of the tilt table 63 in accordance with the measurement program 401 (S202). The overall controller 51 stops the processing head 2, the Y-axis movement table 3, and the tilt table 63 at a designated measurement position for a period of time (S203, FIG. 13).

When the respective components are stopped, the overall controller 51 obtains the measurement value 72 from the measurement device 7 via the inputter 20, and stores the rotation angle of A-axis and the position of the center CS of the reference ball 8 in the storage 40 (S204: measurement process). The overall controller 51 calculates the rotation angle of A-axis from the command angle with respect to A-axis as recorded in the measurement program 401. In addition, since the position of the center CS of the reference ball 8 is kept as the current coordinate values of the reference ball 8 by the overall controller 51, such information is stored in the storage 40.

The overall controller 51 repeats S202 to S204 (S205) at all measurement positions according to the measurement program 401.

Figure 6:
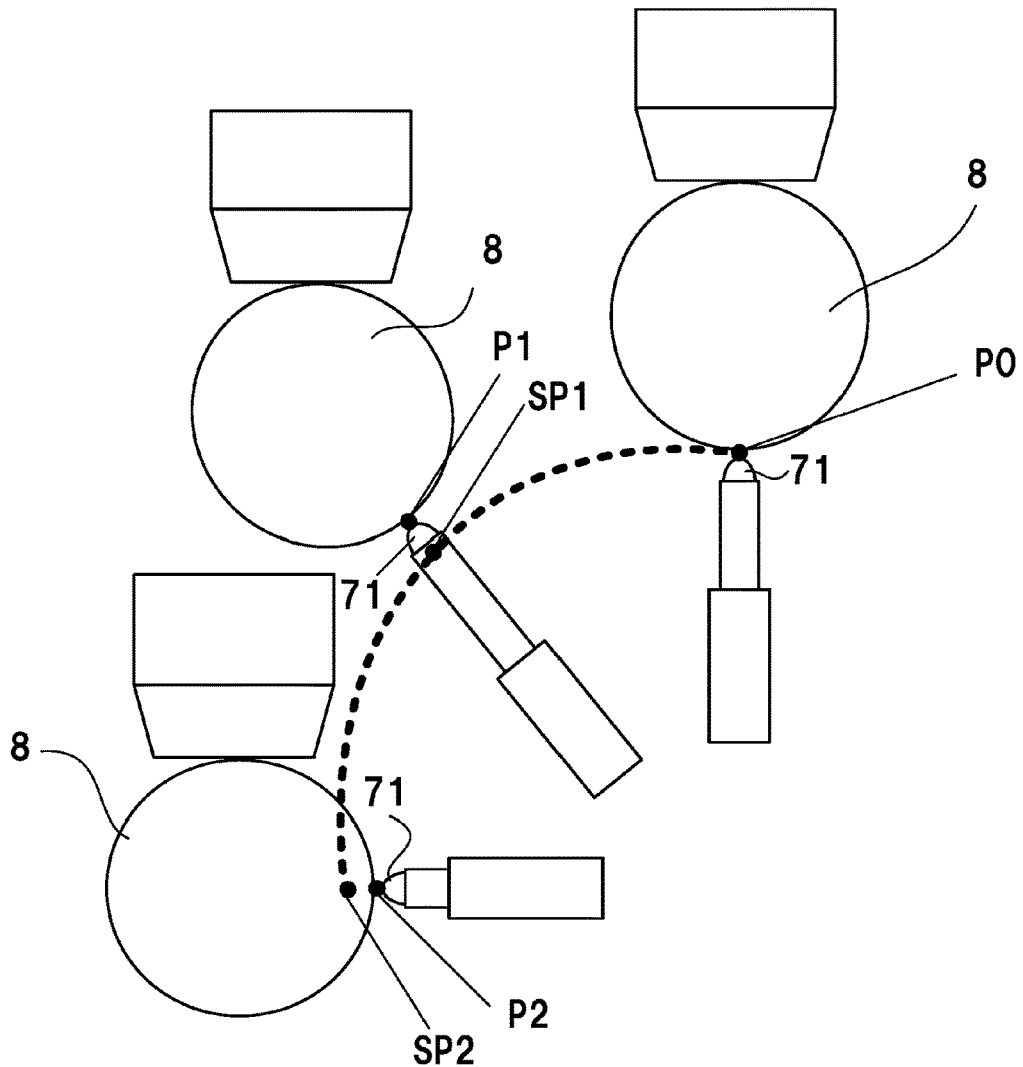
FIG. 6 is a schematic view illustrating a rotation center calculation process of the five-axis processing machine 100 according to the embodiment.

FIG. 6 is a schematic view illustrating a rotation center calculation process of the five-axis processing machine 100.

After the measurement process ends, the rotation center calculator 52 calculates the rotation center of A-axis (S206: rotation center calculation process).

The calculation process of the rotation center of the rotation axis is described in the following according to an example of FIG. 6.

In the example of FIG. 6, measurement values H0, H1, and H2 are respectively obtained at measurement points P0, P1, and P2, and the rotation angles of A-axis and the positions of the center Cs of the reference ball 8 are stored in the storage 40.

The measurement values H0, H1, and H2 at the measurement points P0, P1, and P2 are values obtained by rotating the tilt table 63 using the position of the rotation center before the adjustment process. Therefore, these values are not the same and contain errors. Therefore, with the measurement value H0 at the measurement point P0 obtained in the measurement point search process as reference, the positions of estimated measurement points SP1 and SP2 where the values of the measurement values H1 and H2 are the same as the measurement value H0 are obtained through calculation from the measurement values H1 and H2, the rotation angles of A-axis, and the positions of the center CS of the reference ball 8. Then, the position of the rotation center of A-axis is obtained by using the least square method based on the positions of the measurement point P0 and the estimated measurement points SP1 and SP2.

Here, in the calculated coordinates of the center of the rotation axis of A-axis, the X-coordinate is the coordinate where the measurement device 7 is disposed. Accordingly, the X-coordinate of the rotation center of C-axis obtained through the adjustment process of C-axis is used. Similarly, for the Z-coordinate of the rotation center of C-axis, the Z-coordinate of the rotation center of A-axis is used.

The rotation center calculator 52 stores the obtained position of the rotation center in the storage 40.

In the example of FIG. 6, the rotation center of A-axis is obtained by using the positions of the measurement point P0 and the estimated measurement points SP1 and SP2. However, the measurement points are not limited to three points. The more the measurement points, the higher the accuracy of the position of the rotation center.

Figure 17:
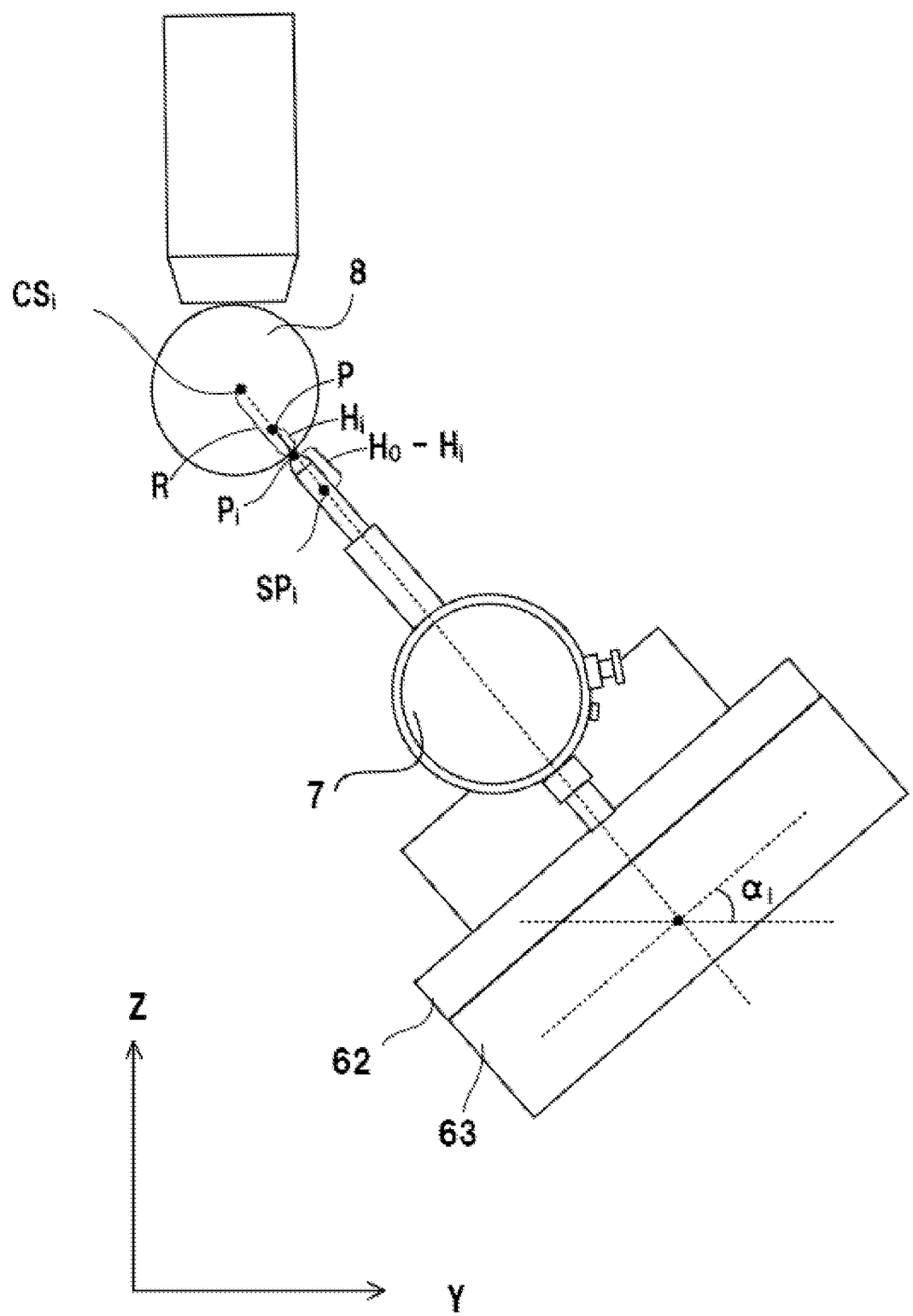
FIG. 17 is a diagram illustrating a rotation center computation process of the five-axis processing machine 100.
Figure 18:
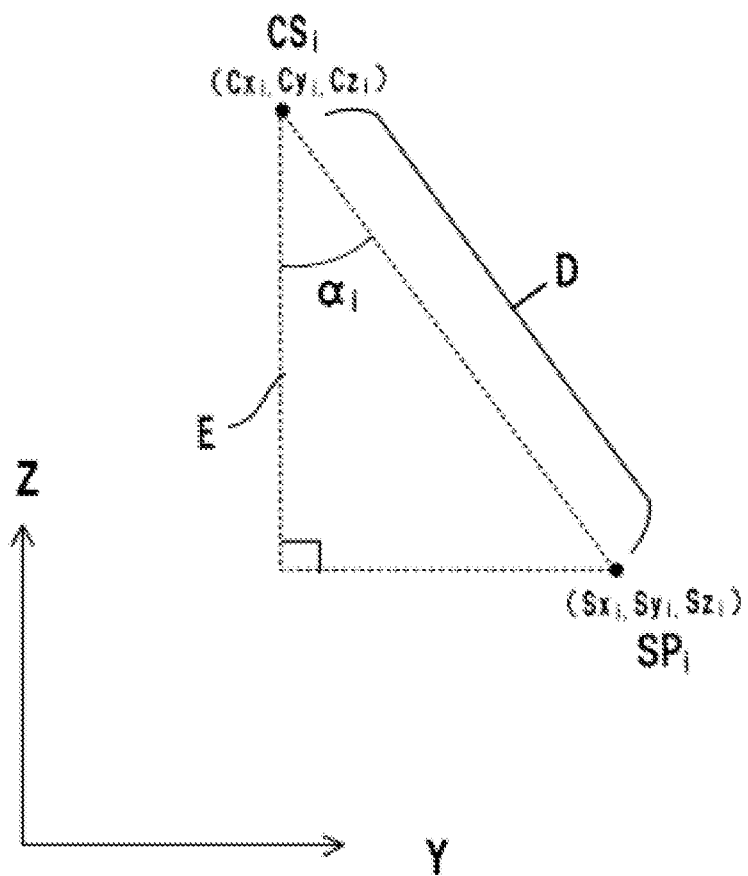
FIG. 18 is a diagram illustrating a rotation center computation process of the five-axis processing machine 100.

Here, a rotation center calculation process for obtaining the position of the rotation center of A-axis is described by using an example of FIGS. 17 and 18.

The measurement point is set as $P_i$ (i=0, 1, 2, ..., L, L being the number of measurement points), the estimated measurement point corresponding to the measurement point $P_i$ is set as $SP_i$, the measurement value at the measurement point $P_i$ is set as $H_i$, the X-coordinate, the Y-coordinate, the Z-coordinate of the estimated measurement point $SP_i$ are respectively set as $(Sx_i, Sy_i, Sz_i)$, the center of the reference ball 8 in the case where the measurement is performed at the measurement point $P_i$ is set as $CS_i$, the X-coordinate, the Y-coordinate, the Z-coordinate of $CS_i$ are respectively set as $(Cx_i, Cy_i, Cz_i)$, the rotation angle when the measurement is performed at the measurement point $P_i$ is set as $\alpha_i$, and the radius of the reference ball 8 is set as R. In addition, P is the position of the tip of the probe 71 in the case where the probe 71 does not contact the reference ball 8.

The measurement values $H_0, H_1, \ldots, H_i, \ldots, H_L$ are respectively obtained at the measurement points $P_0, P_1, \ldots, P_i, \ldots, P_L$, and are stored in the storage 40 together with the rotation angle $\alpha_i$ of A-axis and the position $(Cx_i, Cy_i, Cz_i)$ of the center $CS_i$ of the reference ball 8. In addition, at the measurement point $P_0$, the measurement point search process is executed, and the measurement point $P_0$ serves as the optimal measurement position. Although it is possible to change the rotation angle $\alpha_i$ of A-axis from 0 degrees to 360 degrees and obtain the measurement value $H_i$ by rotating the tilt table 63, the rotation angle of A-axis is here set as $0° \leq \alpha_i \leq 90°$.

In the rotation center calculator 52, by using the measurement value H0 at the measurement point P0 as the reference, the position of the estimated measurement point $SP_i$ $(Sx_i, Sy_i, Sz_i)$ where the value of the measurement value $H_i$ becomes the same as the measurement value $H_0$ is obtained through calculation.

Specifically, a virtual line E parallel to Z-axis is drawn from the position $(Cx_i, Cz_i)$ of the center $CS_i$ of the reference ball 8, as shown in FIG. 18. Then, on a plane parallel to the YZ plane and including the line E, by using the position of the center CS of the reference ball 8 as the apex, a line $CS_iSP_i$ inclined at the rotation angle $\alpha_i$ from the line E is drawn. Then, a point that is on the line $CS_iSP_i$ and is a distance D away from the center CS is set as the estimated measurement point $SP_i$. When the measurement value 72 in the case where the spindle 73 is moved in the direction of being pressed into the inside of the stem 74 is set as a positive value, the distance D is expressed in Formula 1, and the coordinates of the estimated measurement point $SP_i$ are expressed in Formula 2.

$$D = \begin{cases} R + |H_0 - H_i| & \text{if } H_0 \geq H_i \\ R - |H_i - H_0| & \text{if } H_0 < H_i \end{cases} \qquad \text{[Formula 1]}$$

$$Cx_i = Sx_i \qquad \text{[Formula 2]}$$

$$Cy_i = Sy_i + D \times \sin\alpha_i$$

$$Cz_i = Sz_i + D \times \cos\alpha_i$$

From the coordinates of the estimated measurement point $SP_i$ so obtained, the position of the rotation center of A-axis is obtained through the least squares method.

Here, the coordinates of the position of a rotation center RC of A-axis on the plane parallel to the YZ plane and including the line E are set as $(RC_y, RC_z)$, and the radius of a circle formed on the plane with the rotation center RC as the center is set as $R_{rc}$. A circle in which the sum of the differences between the squares of the distances from the respective points of the estimated measurement point $SP_i$ to the rotation center RC and the square of the radius $R_{rc}$ of the circle is minimal is set as a minimum square circle, the coordinates of the position of the rotation center RC of A-axis are obtained.

The differences between the squares of the distances between the rotation center RC of A-axis and the respective points of the estimated measurement point $SP_i$ and the square of the radius $R_{rc}$ are as expressed in Formula 3. A sum S obtained by squaring Formula 3 and adding up for all the estimated measurement points $SP_i$ serves as Formula 4.

$$(Cy_i - RC_y)^2 + (Cz_i - RC_z)^2 - R_{rc}^2 \qquad \text{[Formula 3]}$$

$$S = \sum_{n=0}^{L} \{(Cy_i - RC_y)^2 + (Cz_i - RC_z)^2 - R_{rc}^2\}^2 \qquad \text{[Formula 4]}$$

Since the sum S depends on three variables, i.e., $RC_y$, $RC_z$, and $R_{rc}$, in order to minimize the sum S, it is necessary that the derivative of S with respect to these be zero. The above is as expressed in Formula 5, Formula 6, and Formula 7.

$$\frac{\partial S}{\partial RC_y} = 0 \qquad \text{[Formula 5]}$$

$$\frac{\partial S}{\partial RC_z} = 0 \qquad \text{[Formula 6]}$$

$$\frac{\partial S}{\partial R_{rc}} = 0 \qquad \text{[Formula 7]}$$

When Formula 4 is substituted into Formula 5 and Formula 6 respectively, Formula 5 is represented by Formula 8, and Formula 6 is represented by Formula 9.

$$\sum_{i=0}^{L} Cy_i^3 - 2 \cdot RCy \sum_{i=0}^{L} Cy_i^2 + \sum_{i=0}^{L} Cy_i \cdot Cz_i^2 - 2 \cdot RCz \sum_{i=0}^{L} Cy_i \cdot Cz_i = 0 \qquad \text{[Formula 8]}$$

$$\sum_{i=0}^{L} Cz_i^3 - 2 \cdot RCz \sum_{i=0}^{L} Cz_i^2 + \sum_{i=0}^{L} Cz_i \cdot Cy_i^2 - 2 \cdot RCy \sum_{i=0}^{L} Cy_i \cdot Cz_i = 0 \qquad \text{[Formula 9]}$$

For convenience, when Formula 10 is introduced and Formula 8 and Formula 9 are re-written, Formula 11 and Formula 12 are obtained. Here, symbols p and n of Formula 10 are (p,n=0, 1, 2, 3).

$$T_{pn} = \sum_{i=0}^{L} Cy_i^p \cdot Cz_i^n \qquad \text{[Formula 10]}$$

$$T_{30} - 2 \cdot RC_y T_{20} + T_{12} - 2 \cdot RC_z T_{11} = 0 \qquad \text{[Formula 11]}$$

$$T_{03} - 2 \cdot RC_z T_{02} + T_{21} - 2 \cdot RC_y T_{11} = 0 \qquad \text{[Formula 12]}$$

When Formula 11 and Formula 12 are expressed as a matrix, Formula 13 is obtained. Accordingly, the coordinates ($RC_y$, $RC_z$) of the position of the rotation center RC of A-axis can be obtained as Formula 14. Formula 14 is expressed by using a 2-by-2 inverse matrix.

$$\begin{bmatrix} T_{20} & T_{11} \\ T_{11} & T_{02} \end{bmatrix} \begin{bmatrix} RC_y \\ RC_z \end{bmatrix} = \frac{1}{2} \begin{bmatrix} T_{30} & T_{12} \\ T_{03} & T_{21} \end{bmatrix} \qquad \text{[Formula 13]}$$

$$\begin{bmatrix} RC_y \\ RC_z \end{bmatrix} = \begin{bmatrix} T_{20} & T_{11} \\ T_{11} & T_{02} \end{bmatrix}^{-1} \cdot \frac{1}{2} \begin{bmatrix} T_{30} & T_{12} \\ T_{03} & T_{21} \end{bmatrix} \qquad \text{[Formula 14]}$$

In the case where the stop mode is selected as the method for obtaining the measurement value 72, the measurement value 72 is obtained in the state in which the components, such as the processing head 2 and the tilt table 63, are stopped. Therefore, the influence of the vibration of the components at the time of measurement can be minimized, and the rotation center in a state close to actual processing can be calculated.

Figure 9:
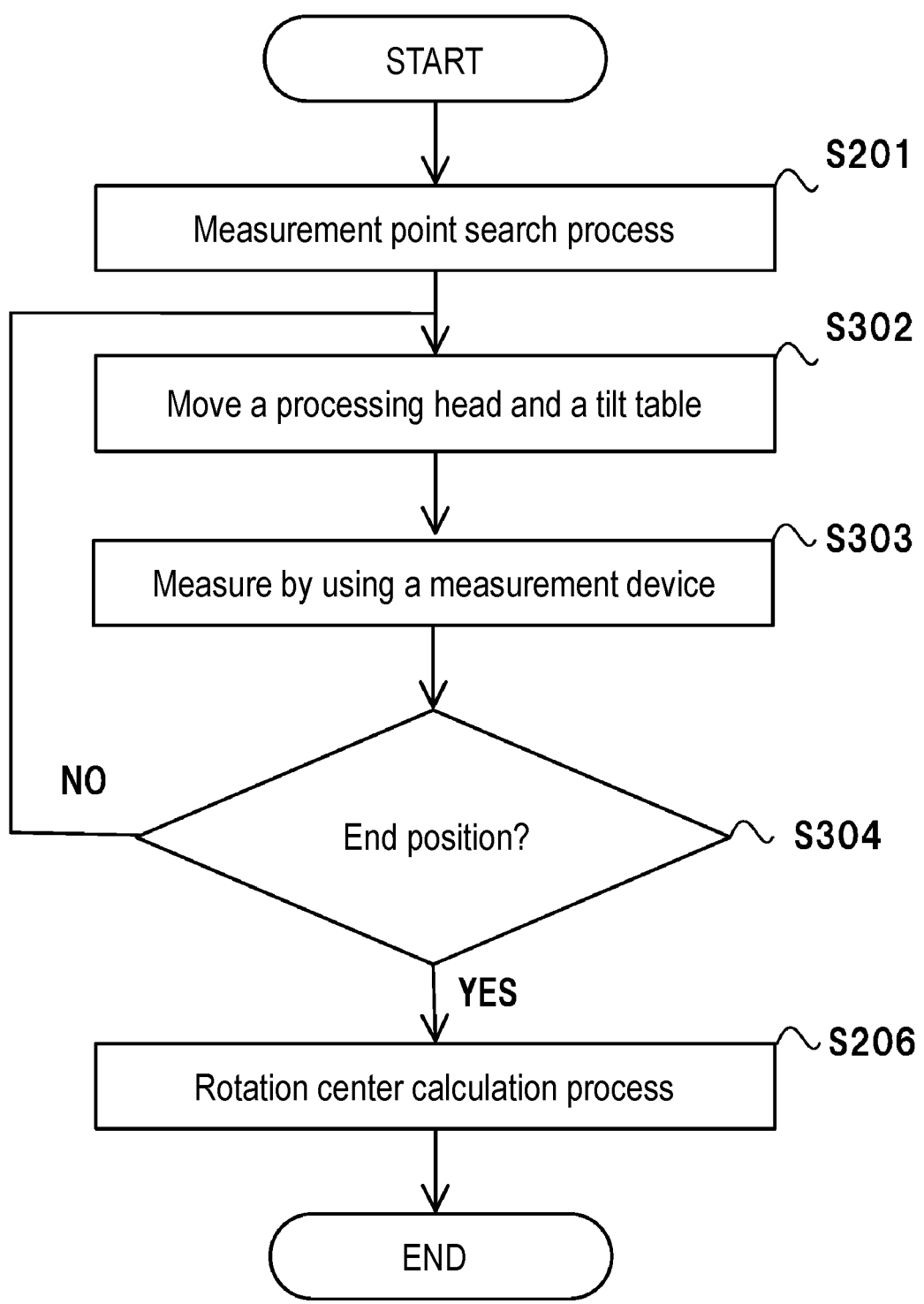
FIG. 9 is a flowchart illustrating a rotation center measurement process (continuous mode) of the five-axis processing machine 100 according to the embodiment.

FIG. 9 is a flowchart illustrating the rotation center measurement process (continuous mode) of the five-axis processing machine 100 according to the embodiment.

In the case where the continuous mode is selected through the setting screen, after executing the measurement point search process (S201), the overall controller 51 obtains the measurement program 401 for the continuous mode from the storage 40, rotates the tilt table 63 about A-axis, performs tip point control and moves the processing head 2 and the Y-axis movement table 3 by following the rotation of the tilt table 63 in accordance with the measurement program 401 (S302). The overall controller 51 obtains the measurement value 72 from the measurement device 7 at the designated measurement position while moving the processing head 2, the Y-axis movement table 3, and the tilt table 63 without temporarily stopping these components, and stores the rotation angle of A-axis and the position of the center CS of the reference ball 8 in the storage 40 (S303: measurement process). The overall controller 51 moves the processing head 2 and the tilt table 63 to a movement end position and stops the processing head 2 and the tilt table 63 (S304: measurement process).

Then, the rotation center calculator 52 calculates the rotation center of A-axis (S206: rotation center calculation process).

As described above, in the case where the continuous mode is selected as the method for obtaining the measurement value 72, the measurement value 72 is obtained while components such as the processing head 2 and the tilt table 63 are being moved without being stopped. Therefore, the measurement time can be reduced, the rotation center can be calculated in a state close to actual processing, and it is possible to suppress the rotation center error to the minimum.

2. Second Embodiment (2.1. Configuration of Five-Axis Processing Machine 200)

Figure 15:
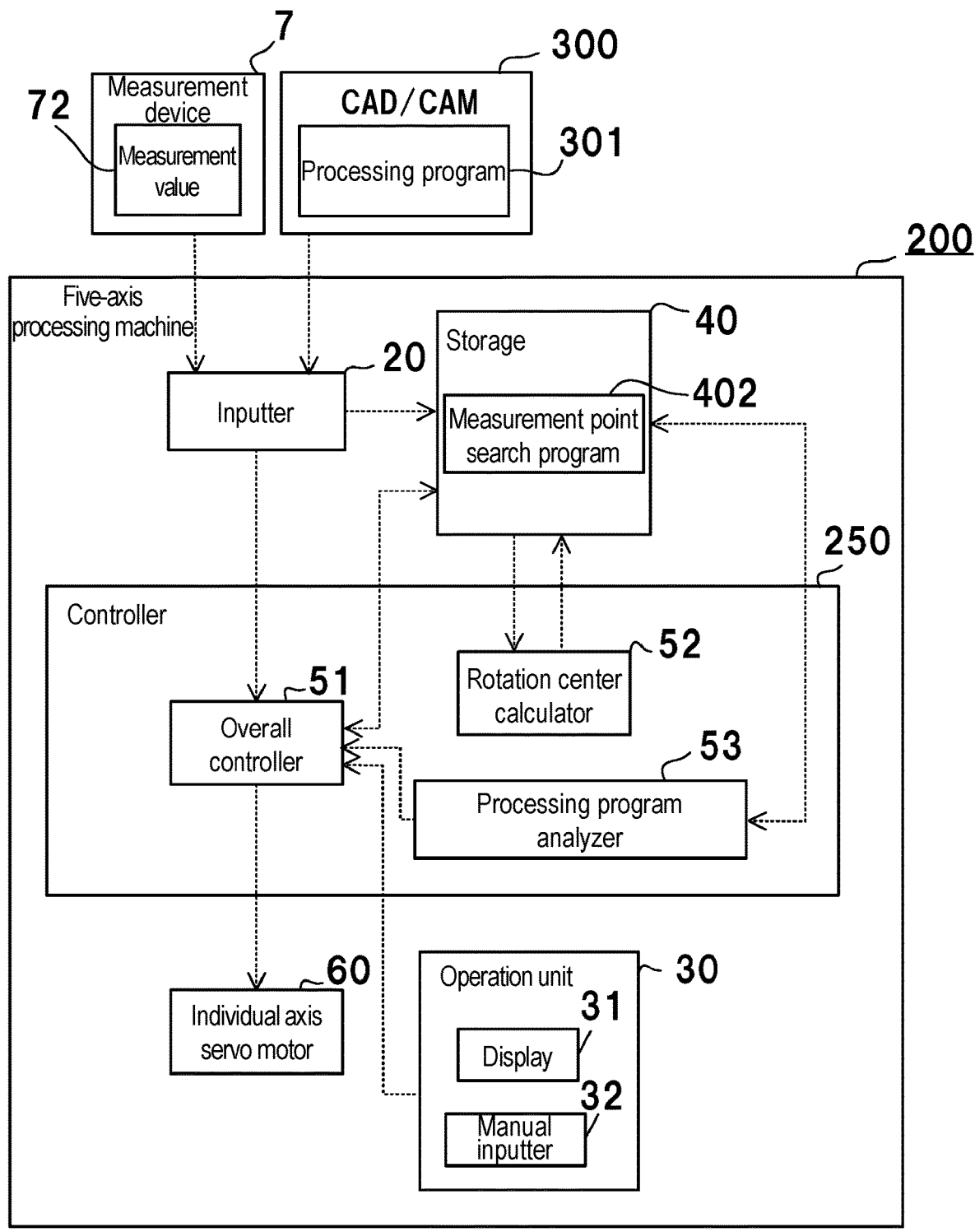
FIG. 15 is a block diagram illustrating a five-axis processing machine 200 according to a second embodiment of the invention.

FIG. 15 is a block diagram illustrating a five-axis processing machine 200 according to a second embodiment of the invention. The five-axis processing machine 200 according to the invention is connected to a CAD/CAM device 300 via the inputter 20, and performs the rotation center measurement by using a processing program 301 obtained from the CAD/CAM device 300. It is noted that, in the embodiment described and shown in the specification and the respective drawings, components same as those of the five-axis processing machine 100 of the first embodiment are labeled with the same symbols, and the description thereof is omitted.

The five-axis processing machine 200 is connected to the CAD/CAM device 300, obtains the processing program 301 from the CAD/CAM device 300 via the inputter 20, and stores the processing program 301 in the storage 40. In addition, the controller 50 drives the Y-axis movement table 3, the tilt table 63, the turn table 62, and each servo motor 60 provided at the tool 61 and performs actual processing based on the processing program 301.

The CAD/CAM device 300 is a device that generates the processing program 301. The CAD/CAM device 300 generates a processing shape of the workpiece, and generates the processing program 301 for operating respective machines based on the processing shape of the workpiece.

The processing program 301 is formed by multiple processing blocks. The processing blocks record G codes designating the command positions of the tip point of the tool 61 and the command angles of tool postures, F codes instructing relative velocities of the tip point of the tool 61 with respect to the workpiece, and M codes, etc. Here, "tool posture" refers to relative postures between the tool and the workpiece. The command angle of the tool posture is designated as a rotation angle of the rotation axis (A-axis, C-axis) in each processing block.

The processing program 301 is input from the CAD/CAM device 300 to the inputter 20. In addition to being input from the CAD/CAM device 300, the processing program 301 may also be input by the operator to the inputter 20 via a storage medium.

A controller 250 is formed by the overall controller 51, the rotation center calculator 52, and a processing program analyzer 53.

The processing program analyzer 53 reads and analyzes the command angle of the tool posture from the processing program 301, and calculates the measurement position for measuring the rotation center or the method for obtaining the measurement value based on analysis results.

Specifically, the processing program analyzer 53 obtains the processing program 301 from the storage 40, and analyzes the processing program 301 to refer to a command angle θn of A-axis and a command angle φn of C-axis (n being an index of the processing block, where n=1, 2, ..., N, and N being the number of processing blocks) in each processing block in the processing program 301. Then, the measurement position in the case of measuring the rotation center of the rotation axis from the command angle θn, φn being referred to is calculated, and the measurement position is stored in the storage 40.

The measurement position can be defined by using a measurement angle $\lambda\_\theta m$ of A-axis and a measurement angle $\lambda\_\varphi m$ of C-axis (m=1, 2, ..., M, M being the number of measurement angles). For example, a frequency distribution in the processing program 301 is calculated from the command angle θn, φn of the rotation axis, and multiple points of the command angle θn, φn with a high appearance frequency is set as the measurement angle $\lambda\_\theta m$, $\lambda\_\varphi m$.

The processing program analyzer 53 further refers to the processing program 301 and performs an analysis on whether the processing program 301 is a program which performs processing in the state in which the rotation axis is stopped or the processing program 301 is a program which performs processing while the rotation axis is operated. In the case where the processing program 301 is a program which performs processing in the state in which the rotation axis is stopped, the method for obtaining the measurement value 72 is stored as the stop mode in the storage 40, and in the case where the processing program 301 is a program which performs processing while the rotation axis is operated, the method for obtaining the measurement value 72 is stored as the continuous mode in the storage 40.

The overall controller 51 rotates the rotation axis to obtain the measurement value 72 from the measurement device 7 at the measurement position calculated in the processing program analyzer 53 in the case of measuring the rotation center, and stores the rotation angle of the rotation axis and the position of the center CS of the reference ball 8 in the storage 40.

(2.2. Description of Method for Measuring Rotation Center)

Figure 16:
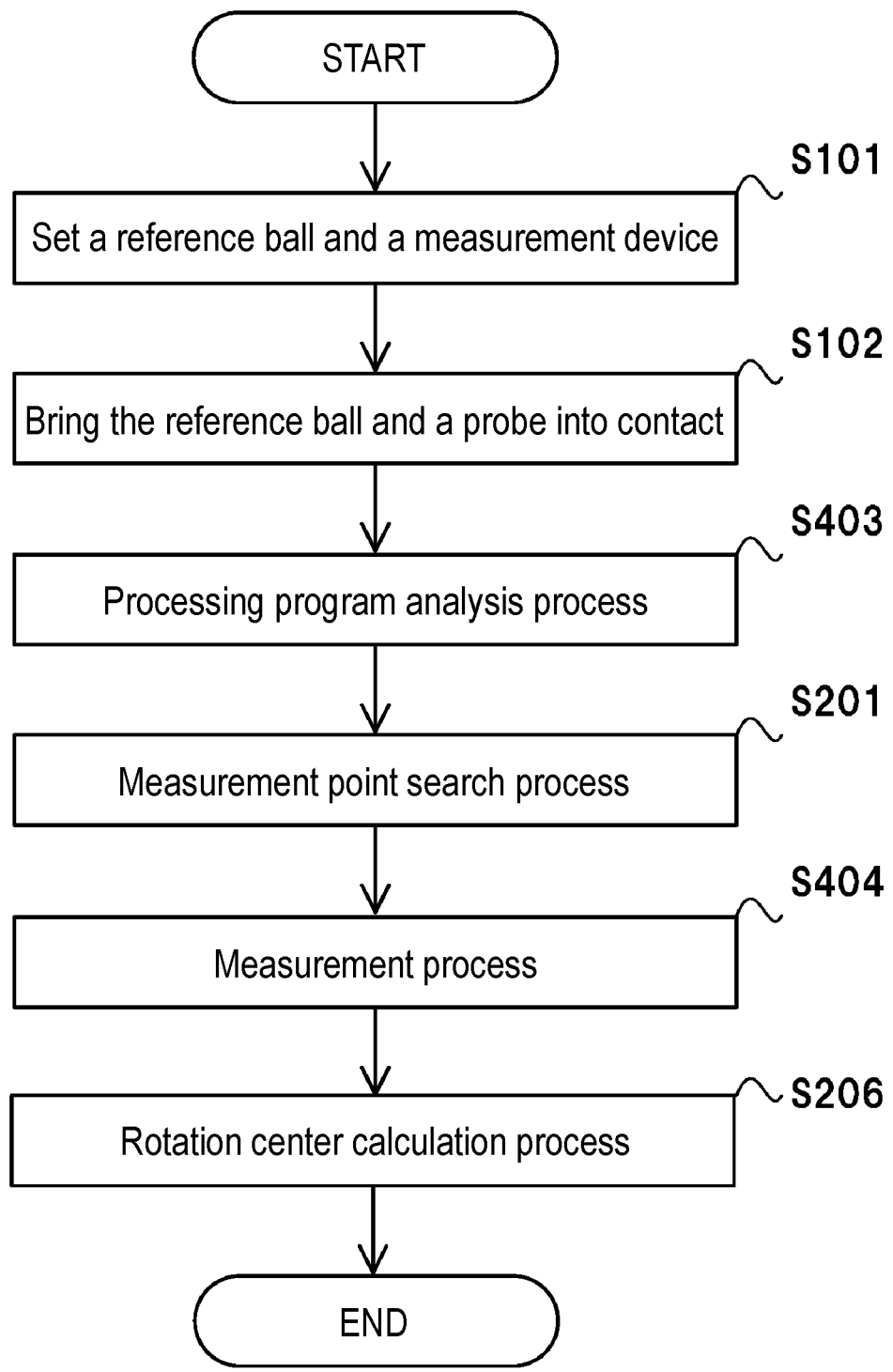
FIG. 16 is a diagram of an overall flow illustrating a procedure for measuring a rotation center of the five-axis processing machine 200 according to the embodiment.

FIG. 16 is a diagram of an overall flow illustrating a procedure for measuring the rotation center of the five-axis processing machine 200 according to the embodiment.

The operator performs the rotation center measurement of the five-axis processing machine 200 according to the following before processing the workpiece.

The operator generates the processing program 301 by using the CAD/CAM device 300, etc., and stores the processing program 301 in the storage 40 via the inputter 20.

Then, the operator installs the reference ball 8 to the installation part 21 of the processing head 2, and disposes the measurement device 7 on the turn table 62 (S101). Then, the operator operates the processing head 2 and the Y-axis movement table 3 via the manual inputter 32 to move the reference ball 8 to a position contacting the probe 71 of the measurement device 7 (S102).

Then, the operator operates the setting screen displayed on the display 31 via the inputter 32 to display the processing program 301 on the setting screen. The operator selects the processing program 301 displayed on the display 31 and presses the start button for carrying out the rotation center measurement.

The processing program analyzer 53 obtains the processing program 301 from the storage 40, analyzes the processing program 301 to calculate the measurement position in the case of measuring the rotation center of the rotation axis from the command angle θn, φn of the rotation axis in the processing program 301, and stores the measurement position in the storage 40 (S403: processing program analysis process). Moreover, the processing program analyzer 53 analyzes the processing program 301 to calculate the method for obtaining the measurement value 72 for performing the rotation center measurement, and stores whether the method is the stop mode or the continuous mode in the storage 40.

Then, the overall controller 51 executes the measurement point search process at the initial measurement position calculated in the processing program analyzer 53 (S201: measurement point search process) and executes the measurement process (S404). Specifically, after the measurement point search process ends, the overall controller 51 rotates the tilt table 63 or the turn table 62 about the rotation axis in the state in which the reference ball 8 contacts the probe 71 of the measurement device 7, performs the tip point control and moves the processing head 2 and the Y-axis movement table 3 by following the rotation of the rotation axis. The overall controller 51 obtains the measurement value 72 from the measurement device 7 at the measurement position stored in the storage 40, and stores the rotation angle of the rotation axis and the position of the center CS of the reference ball in the storage 40. The overall controller 51 obtains the measurement values at all the measurement positions.

The overall controller 51 refers to the method for obtaining the measurement value 72 stored in the storage 40, and, in the case of the stop mode, obtains the measurement value 72 in the state in which the components such as the processing head 2 and the tilt table 63 are stopped at the measurement position. Meanwhile, in the case of the continuous mode, the overall controller 51 obtains the measurement value 72 while moving the components without temporarily stopping the components.

Then, the rotation center calculator 52 calculates the rotation center of the rotation axis (S206: rotation center calculation process).

In the above description, the method for obtaining the measurement value 72 is selected through the analysis of the processing program analyzer 53. However, the method may also be manually selected by the operator through the setting screen.

In this way, since the processing program used at the time of processing the workpiece is used to calculate the measurement position, and the position of the rotation center of the rotation axis is calculated, the position of the rotation center can be obtained in the state close to actual processing.

3. Other Embodiments

Although the embodiments of the invention are described as the above, the applicability of the disclosure is not limited to the above contents.

For example, two rotation axes are provided on the table side such as the tilt table 63 and the turn table 62, the invention is not limited to such configuration. For example, the invention is also applicable to a configuration in which one axis is provided on each of the table side and the tool side or a five-axis control processing machine with two axes provided on the tool side.

In addition, in the embodiments of the invention, the description is made based on a five-axis control processing machine with three straight axes, i.e., X-axis, Y-axis, and Z-axis, and two rotation axes, i.e., A-axis and C-axis. However, the invention is not limited to such configuration. That is, instead of A-axis, control may be exerted in the rotation of B-axis (i.e., a rotation axis parallel to Y-axis), and the invention is also applicable to a processing machine of six-axis control, i.e., the three straight axes of X-axis, Y-axis, and Z-axis, and three rotation axes of A-axis, B-axis, and C-axis, as the multi-axis processing machine.

Moreover, in the embodiment, the reference ball 8 is installed to the installation part 21 of the processing head 2 of the five-axis processing machine 100, and the measurement device 7 is installed onto the turn table 62. However, it may also be that the measurement device 7 is installed to the processing head 2, and the reference ball 8 is installed onto the turn table 62. The invention is applicable as long as the rotation axis can be moved in the state in which the reference ball 8 contacts the probe 71 of the measurement device 7.

Although various embodiments of the invention have been described above, these are presented as examples and are not intended to limit the scope of the invention. The novel embodiment can be implemented in various other embodiments, and various omissions, replacements, and changes can be made without departing from the gist of the invention. The embodiments and modifications thereof are included in the scope and gist of the invention, and are included in the scope of the invention described in the claims and the equivalent scope thereof.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for measuring a rotation center of a multi-axis processing machine,
   wherein the multi-axis processing machine has a rotation axis, and a processing head and a table are configured to be relatively rotatable, and
   wherein the method uses a reference ball and a measurement device which has a probe and measures, as a measurement value, a movement amount of the probe when the reference ball contacts the probe and comprises:
   a measurement process of rotating the rotation axis to measure the measurement value in a state in which the probe of the measurement device installed to one of the processing head and the table contacts the reference ball installed to another of the processing head and the table;
   a measurement point search process of, before the measurement process, monitoring the measurement value while changing relative positions between the reference ball and the probe in the state in which the probe contacts the reference ball, and setting a maximum value of the measurement value as the measurement value for calculating a rotation center of the rotation axis; and
   a rotation center calculation process of calculating the rotation center of the rotation axis from the measurement value, a rotation angle of the rotation axis, and a position of a center of the reference ball.

2. The method for measuring the rotation center of the multi-axis processing machine as claimed in claim 1,
   wherein in the measurement process, a method for obtaining the measurement value is selected from a plurality of types.

3. The method for measuring the rotation center of the multi-axis processing machine as claimed in claim 1,
   wherein in the measurement process, the measurement value is obtained by using the measurement device in a state in which the processing head, the rotation axis, and the table are temporarily stopped.

4. The method for measuring the rotation center of the multi-axis processing machine as claimed in claim 1,
   wherein in the measurement process, the measurement value is obtained by using the measurement device while the processing head, the rotation axis, and the table are moved continuously without being stopped temporarily.

5. The method for measuring the rotation center of the multi-axis processing machine as claimed in claim 1, comprising: a processing program analysis process of analyzing a processing program and calculating a measurement position for measuring the rotation center or a method for obtaining the measurement value based on an analysis result.

6. The method for measuring the rotation center of the multi-axis processing machine as claimed in claim 1, wherein the measurement device is a dial gauge.

7. A multi-axis processing machine, comprising a rotation axis and a controller wherein a processing head and a table are configured to be relatively rotatable by the rotation axis,
   wherein the controller uses a reference ball and a measurement device which has a probe and measures, as a measurement value, a movement amount of the probe when the reference ball contacts the probe, and the controller is configured to execute:
   a measurement process of rotating the rotation axis to measure the measurement value in a state in which the probe of the measurement device installed to one of the processing head and the table contacts the reference ball installed to another of the processing head and the table;
   a measurement point search process of, before the measurement process, monitoring the measurement value while changing relative positions between the reference ball and the probe in the state in which the probe contacts the reference ball, and setting a maximum value of the measurement value as the measurement value for calculating a rotation center of the rotation axis; and
   a rotation center calculation process of calculating the rotation center of the rotation axis from the measurement value, a rotation angle of the rotation axis, and a position of a center of the reference ball.

* * * * *